United States Patent
Dong et al.

(10) Patent No.: US 11,947,991 B2
(45) Date of Patent: Apr. 2, 2024

(54) METHODS AND APPARATUS TO PROCESS COMMANDS FROM VIRTUAL MACHINES

(71) Applicant: Intel Corporation, Santa Clara, CA (US)

(72) Inventors: Yao Zu Dong, Shanghai (CN); Yuankai Guo, San Jose, CA (US); Haozhong Zhang, Shanghai (CN); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/845,752

(22) Filed: Jun. 21, 2022

(65) Prior Publication Data

US 2022/0326979 A1 Oct. 13, 2022

Related U.S. Application Data

(63) Continuation of application No. 16/638,065, filed as application No. PCT/CN2017/103385 on Sep. 26, 2017, now Pat. No. 11,403,129.

(51) Int. Cl.
  *G06F 9/455* (2018.01)
  *G06F 13/16* (2006.01)

(52) U.S. Cl.
  CPC ...... *G06F 9/45558* (2013.01); *G06F 13/1668* (2013.01); *G06F 2009/45579* (2013.01); *G06F 2009/45583* (2013.01)

(58) Field of Classification Search
  None
  See application file for complete search history.

(56) References Cited

U.S. PATENT DOCUMENTS 7,395,405 B2 7/2008 Anderson et al.
7,613,847 B2 * 11/2009 Kjos .................. G06F 12/1081
  711/6

(Continued)

FOREIGN PATENT DOCUMENTS

CN 107111498 8/2017
WO 2016037344 3/2016

OTHER PUBLICATIONS

Pinto et al. "A zero-copy shared memory framework for host-guest data sharing in KVM", 2016 IEEE, pp. 603-610.*

(Continued)

*Primary Examiner* — Van H Nguyen
(74) *Attorney, Agent, or Firm* — Hanley, Flight & Zimmerman, LLC

(57) ABSTRACT

A disclosed example includes accessing, by a backend block service driver in an input/output virtual machine executing on one or more processors, a first command submitted to a buffer by a paravirtualized input/output frontend block driver executing in a guest virtual machine; generating, by the backend block service driver, a translated command based on the first command by translating a virtual parameter of the first command to a physical parameter associated with a physical resource; submitting, by the backend block service driver, the translated command to an input/output queue to be processed by the physical resource based on the physical parameter; and submitting, by the backend block service driver, a completion status entry to the buffer, the completion status entry indicative of completion of a direct memory access operation that copies data between the physical resource and a guest memory buffer corresponding to the guest virtual machine.

21 Claims, 13 Drawing Sheets

(56) References Cited

U.S. PATENT DOCUMENTS

| | | |
|---|---|---|
| 7,613,898 B2 | 11/2009 | Haertel et al. |
| 8,060,722 B2 | 11/2011 | Adams et al. |
| 8,214,622 B2 | 7/2012 | Blandy et al. |
| 8,443,156 B2 | 5/2013 | Adams et al. |
| 8,463,980 B2 * | 6/2013 | Post .................... G06F 9/45541 |
| | | 711/6 |
| 8,799,879 B2 | 8/2014 | Wright et al. |
| 8,904,390 B2 | 12/2014 | Easton et al. |
| 8,938,571 B1 * | 1/2015 | Vincent ................. G06F 9/5077 |
| | | 710/118 |
| 9,317,444 B2 * | 4/2016 | Davda ................. G06F 12/1081 |
| 9,535,732 B2 * | 1/2017 | Tsirkin ............... G06F 9/45558 |
| 10,241,931 B2 | 3/2019 | Kaplan et al. |
| 10,324,748 B2 | 6/2019 | Dong et al. |
| 10,482,567 B2 | 11/2019 | Lv et al. |
| 10,891,237 B2 | 1/2021 | Dong |
| 2011/0126195 A1 | 5/2011 | Tsirkin |
| 2013/0262649 A1 | 10/2013 | Shimmitsu et al. |
| 2014/0359612 A1 | 12/2014 | D'Amato et al. |
| 2016/0292816 A1 | 10/2016 | Dong |
| 2016/0328333 A1 | 11/2016 | Dong et al. |
| 2018/0335956 A1 * | 11/2018 | Iyer ........................ G06F 3/067 |
| 2020/0174819 A1 | 6/2020 | Dong et al. |

OTHER PUBLICATIONS

Alam et al. "Do-it-yourself virtual memory translation", 2017 IEEE, pp. 457-468.*

Kornaros et al. "I/O Virtualization Utilizing an Efficient Hardware System-level Memory Management Unit", 2014 IEEE, 4 pages.*

International Searching Authority, "International Search Report," dated Jun. 25, 2018 in connection with International Patent Application No. PCT/CN2017/103385, 5 pages.

International Searching Authority, "Written Opinion," dated Jun. 25, 2018 in connection with International Patent Application No. PCT/CN2017/103385, 4 pages.

United States Patent and Trademark Office, "Notice of Allowance and Fee(s) Due," dated Mar. 24, 2022 in connection with U.S. Appl. No. 16/638,065, 9 pages.

* cited by examiner

```
struct vnvm_dev_state {
    spinlock_t lock;
    // Which portion of physical NVMe is used by this vNVMe?
    // Maintained by DevifEmul
    uint64_t lba_base;              // start physical LBA
    uint64_t nr_sects;              // number of sectors
    uint64_t sect_size;             // sector size
    // Mapping between shadow queues and physical queues
    // Maintained by ShQMgmt
    uint16_t sh_qid[MAX_QID];       // physical qid to shadow qid
    gpa_t   *sh_gpa[MAX_QID];       // GPA of shadow queue
    struct eventfd_ctx sh_msix[MAX_QID]; // Guest MSI-x of shadow queue
    int     nr_queues;              // number of shadow queues have been created
    ...
}
```

802 brace: lba_base, nr_sects, sect_size 804 brace: sh_qid, sh_gpa, sh_msix, nr_queues

FIG. 8

```
902  int vnvm_sh_cq_create(struct vnvm_dev_state *st,
                          uint16_t sh_cq_id, uint16_t sh_cq_sz,
                          uint16_t sh_irq_vec)

904  int vnvm_sh_sq_create(struct vnvm_dev_state *st,
                          uint16_t sh_sq_id, uint16_t sh_sq_sz,
                          uint16_t sh_cq_id)

906  int vnvme_sh_cq_del(struct vnvm_dev_state *st, uint16_t sh_qid)

908  int vnvme_sh_sq_del(struct vnvm_dev_state *st, uint16_t sh_qid)

910  int vnvme_sh_cq_submit(struct vnvm_dev_state *st,
                           uint16_t sh_qid, uint16_t tail)
```

METHODS AND APPARATUS TO PROCESS COMMANDS FROM VIRTUAL MACHINES

RELATED APPLICATIONS

This patent arises from a continuation of U.S. patent application Ser. No. 16/638,065, filed on Feb. 10, 2020, (now U.S. Pat. No. 11,403,129) which is a U.S. National Stage Entry of PCT Application No. PCT/CN2017/103385, filed on Sep. 26, 2017, both of which are hereby incorporated herein by reference in their entireties.

FIELD OF THE DISCLOSURE

The present disclosure relates generally to memory in processor systems and, more particularly, to methods and apparatus to process commands from virtual machines.

BACKGROUND

In virtualized processing environments, a single physical platform is shared across multiple virtual machines (VMs) and/or virtual operating systems (OSs). Such virtualization employs a number of physical resources to allocate as virtual resources to the different VMs. For example, resources include central processing units (CPUs), storage (e.g., nonvolatile data storage devices), memory (e.g., volatile random access memory (RAM)), graphics processing units (GPUs), network interface cards (NICs), etc. For storage devices, prior storage input-output (I/O) virtualization solutions were designed based on old hardware technologies such as magnetic-based hard disk drive (HDD) storage and/or old slow NAND solid state drive (NAND-SSD) storage.

BRIEF DESCRIPTION OF THE DRAWINGS

FIG. 8 shows example machine readable instructions that may be executed to define interfaces of the virtual NVMe device of FIGS. 2 and 4-6 to implement the example ZCBV-MPT techniques described in connection with FIG. 2.

FIG. 9 shows example machine readable instructions that may be executed to define functions of the virtual NVMe device of FIGS. 2 and 4-6 to implement the example ZCBV-MPT techniques described in connection with FIG. 2.

The figures are not to scale. Wherever possible, the same reference numbers will be used throughout the drawing(s) and accompanying written description to refer to the same or like parts.

DETAILED DESCRIPTION

Figure 1:
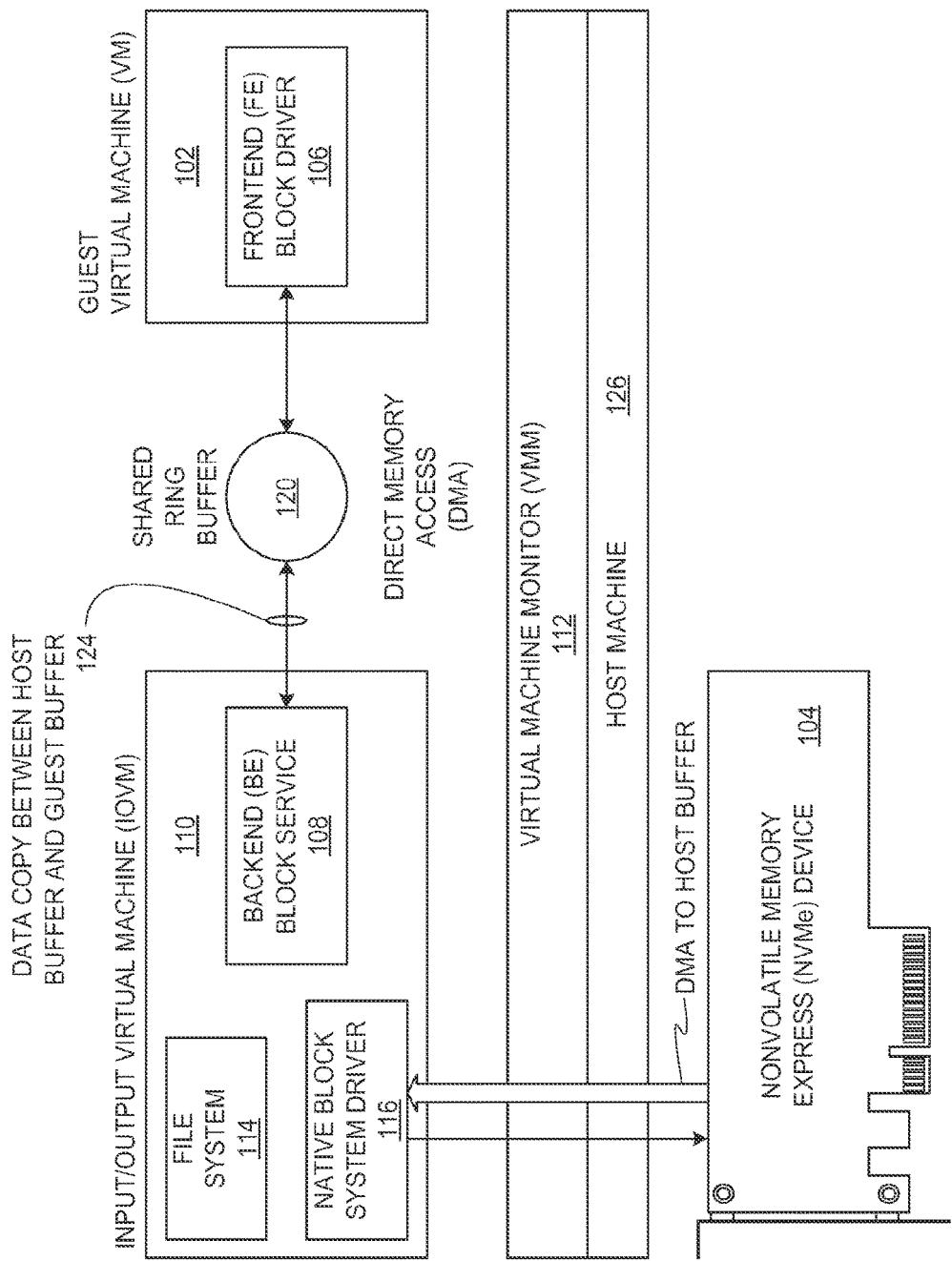
FIG. 1 illustrates an example prior paravirtualization (PV) block I/O service used to provide VMs with access to physical nonvolatile (NV) memory implemented as nonvolatile memory express (NVMe) devices.

Examples disclosed herein may be used to process commands from virtual machines using techniques that improve virtualization performance associated with accessing virtualized storage and memory space. Examples disclosed herein are described in connection with virtualization of nonvolatile memory express (NVMe) devices. An NVMe device is a data storage device that communicates with a host via a NVMe protocol and is implemented using nonvolatile memory (e.g., memory devices that use chalcogenide glass, single-threshold or multi-threshold level NAND flash memory, NOR flash memory, 3D flash memory, three dimensional (3D) crosspoint memory, ferroelectric transistor random access memory (FeTRAM or FeRAM), multi-level phase change random access memory (PRAM, PCM), anti-ferroelectric memory, magnetoresistive random access memory (MRAM) memory that incorporates memristor technology, resistive memory including the metal oxide base, oxygen vacancy base and conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, non-volatile RAM (NVRAM), resistive random access memory (Re-RAM), a resistive memory, nanowire memory, or a combination of any of the above, or other memory). The NVMe protocol is a high-performance scalable host controller interface developed by NVM Express, Inc. for use by enterprise and/or client systems that use PCI Express®-based solid-state storage. The NVMe interface is typically used for fast storage I/O. With NVMe, an operating system (OS) may issue an I/O request by placing a DMA request in an I/O queue, and an NVMe driver may utilizes multiple I/O queues (e.g., Intel® Optane™ devices support 16 I/O queues) to service multiple I/O requests using parallel I/O processing. However, examples disclosed herein may be implemented in connection with any other type of NV memory device that uses any other type of host controller interface, bus interface, and/or transfer protocol. For example, example techniques disclosed herein may be adapted for use with the Serial Advanced Technology Attachment (SATA) express (SATAe) bus interface protocol and/or the mini-SATA (mSATA) bus interface protocol defined by the Serial ATA International Organization. Additionally or alternatively, example techniques disclosed herein may be adapted for use with the Serial Attached Small Computer System Interface (SCSI) protocol otherwise known as the SAS bus interface protocol and defined by the International Committee for Information Technology Standards (INCITS). In yet other examples, example techniques disclosed herein may be adapted for use with the Advanced Host Controller Interface (AHCI) bus interface protocol defined by Intel Corporation. Additionally or alternatively, techniques disclosed herein may be adapted for use with any other suitable bus interface standards presently available and/or suitable bus interface standards arising from future developments.

Virtualization technologies involve a single physical platform hosting multiple guest virtual machines (VMs). To allocate use of hardware resources (e.g., central processing units (CPUs), network interface cards (NICs), storage, memory, graphics processing units (GPUs), etc.), a number of virtualization techniques were developed that enables virtualizing such physical hardware resources to allocatable virtual resources. For example, a single physical CPU could be allocated as multiple virtual CPUs to different VMs. Each VM identifies corresponding virtual CPU(s) as its own CPU(s), but in actuality each VM is using only a portion of the same underlying physical CPU that is also used by other VMs. Similarly, a single physical storage device could be allocated as multiple virtual data stores to different VMs. Each VM has independent access to its allocated virtual data storage space independent of others of the VMs, but all of the VMs are accessing the same underlying physical storage device by using respective portions of the physical storage device isolated or partitioned separate from other portions of the physical storage device.

Prior data storage virtualization techniques are based on old hardware technologies such as magnetic-based hard disk drive (HDD) storage and/or old slow NAND solid state drive (NAND-SSD) storage. As such, prior data storage virtualization techniques are based on capabilities of prior storage devices that operate slower than recently developed storage devices. As such, when newer storage devices are used with older virtual systems, data access performance is limited by prior data storage virtualization techniques that were developed based on prior, slower storage devices.

FIG. 1 illustrates a prior PV block I/O service used to provide a guest VM 102 with access to physical NV memory 104 implemented as an NVMe device. The prior PV block I/O service of FIG. 1 is a storage/block I/O virtualization solution. In FIG. 1, the guest VM 102 runs a paravirtualized driver represented as a frontend (FE) block driver 106. A paravirtualized driver is a driver that is capable of directly accessing hardware via a native device driver without needing an intermediate host operating system (OS) to emulate hardware for the paravirtualized driver. Unlike paravirtualization, full virtualization uses fully virtualized drivers executing in guest VMs. Such fully virtualized drivers make calls to virtual hardware that is emulated by a host OS. The host OS emulates the hardware, forwards the calls to the underlying physical devices via native device drivers, receives responses from the physical devices and forwards the responses via the emulated hardware to the virtualized drivers of guest VMs.

In FIG. 1, the guest VM 102 can be implemented using a kernel-based virtual machine (KVM), and the FE block driver 106 can be implemented using a virtio-block driver, which communicates with a backend (BE) block service 108 running in an input/output virtual machine (IOVM) 110 executing on a host OS (or service OS) shown in FIG. 1 as a virtual machine monitor (VMM) 112 (e.g., a hypervisor). Virtio is a virtualization standard for network and disk device drivers for use in a paravirtualized hypervisor (e.g., the VMM 112) where just the guest VM's device driver (e.g., the FE block driver 106 of FIG. 1) "knows" it is running in a virtual environment. The FE block driver 106 relies on a host-side file system 114 and/or a native block system driver 116 of the IOVM 110 to read and/or write from/to the storage implemented by the physical NV memory 104.

An example process flow of the prior PV block I/O service of FIG. 1 involves the FE block driver 106 placing a read request in a shared ring buffer 120 to be accessed and processed by the BE block service 108. Based on the read request accessed by the BE block service 108, the IOVM 110 allocates a host memory buffer, and the native block system driver 116 sends a request to the physical NV memory 104 to read the requested data to the host memory buffer. The physical NV memory 104 performs a direct memory access (DMA) to write the requested data to the host memory buffer. The BE block service 108 then copies the data from the host memory buffer in the IOVM 110 to a guest memory buffer via the shared ring buffer 120 as shown by reference numeral 124. The FE block driver 106 can then access the requested data from the guest memory buffer. However, the data copy 124 is performed by a CPU of a host machine 126 on which the VMM 112 runs. As such, during memory-intensive copy operations CPU resources of the host machine 126 can become overloaded such that other processes of the host machine 126 decrease in performance.

The resource and delay cost of such data copying 124 of FIG. 1 for block devices such as NV memory is usually acceptable for legacy hardware in which the bandwidth of a hard disk drive (HDD) and/or a slow NAND solid state drive (SSD) is at most 100s MB/s. For such legacy hardware, a guest VM may be still able to achieve close to maximum throughput for native physical storage devices by trading off CPU cycles necessary to perform the data requesting and copying. However, such processing and time resources become a big problem when using newer, faster storage devices device in a host such as fast NAND-SSD and/or phase-change memory (PCM)-based Intel® Optane™ devices, which can achieve two GB/s data transfer speeds. Using the prior technique of FIG. 1 with such newer, faster storage devices would result in saturating the processor resources, resulting in limiting the virtualization performance (guest throughput vs. the physical throughput) of the virtual system. In addition, the latency impact of virtualization overhead associated with the prior technique of FIG. 1 would negatively impact performance when used with such newer, faster storage devices.

Examples disclosed herein improve virtualization performance associated with accessing storage and/or memory space. Examples disclosed herein include a zero-copy block virtualization—mediated passthrough (ZCBV-MPT) technique and a zero-copy block virtualization—paravirtualization I/O (ZCBV-PVIO) technique. In the example ZCBV-MPT technique, a guest VM runs a native NVMe device driver to access a physical NVMe memory by placing data access requests in a guest queue. The example ZCBV-MPT technique also involves a VMM managing a shadow queue corresponding to the guest queue. To improve data access performance, the shadow queue may be executed directly in the hardware NVMe memory controller, so that the NVMe device can perform DMA operations to copy requested data directly between the NVMe memory space and guest memory space that is then accessible by the native NVMe device driver running in the guest VM without needing interception by the VMM in the bulk data path. Further details of ZCBV-MPT examples are described below in connection with FIGS. 2-9 and 11.

The example ZCBV-PVIO involves using a PV block IO (PV-IO) driver to directly perform DMA operations between an NVMe memory device and a guest block buffer that is accessible by a guest VM. In the example ZCBV-PVIO technique, a guest VM executes the PV-IO driver. In some examples, the PV-IO driver may be implemented using a KVM virtio driver. In examples disclosed herein, the PV-IO driver utilizes an optimized I/O interface for virtualization, which extends the NVMe driver in the IOVM (or host) side. The PV-IO driver directly manages shadow queues using a guest memory buffer, and executes the shadow queues in the physical NVMe device to perform DMA operations to copy data directly between the NVMe device and the guest memory buffer, without needing to perform data copy operations using the IOVM. Further details of ZCBV-PVIO examples are described below in connection with FIGS. 10 and 12.

The example ZCBV techniques disclosed herein eliminate the need to perform data copy operations on the VMM backend side of a virtualized system. As a result, the example ZCBV techniques disclosed herein improve efficiencies of block device I/O virtualizations. In addition to reducing the usage of CPU cycles (e.g., used to perform copy operations of the bulk data between NVMe memory and guest VM memory space), example ZCBV techniques disclosed herein also improve responsiveness (e.g., reduce latency) of virtual resources (e.g., virtual data store resources based on underlying physical NVMe data store resources).

Figure 2:
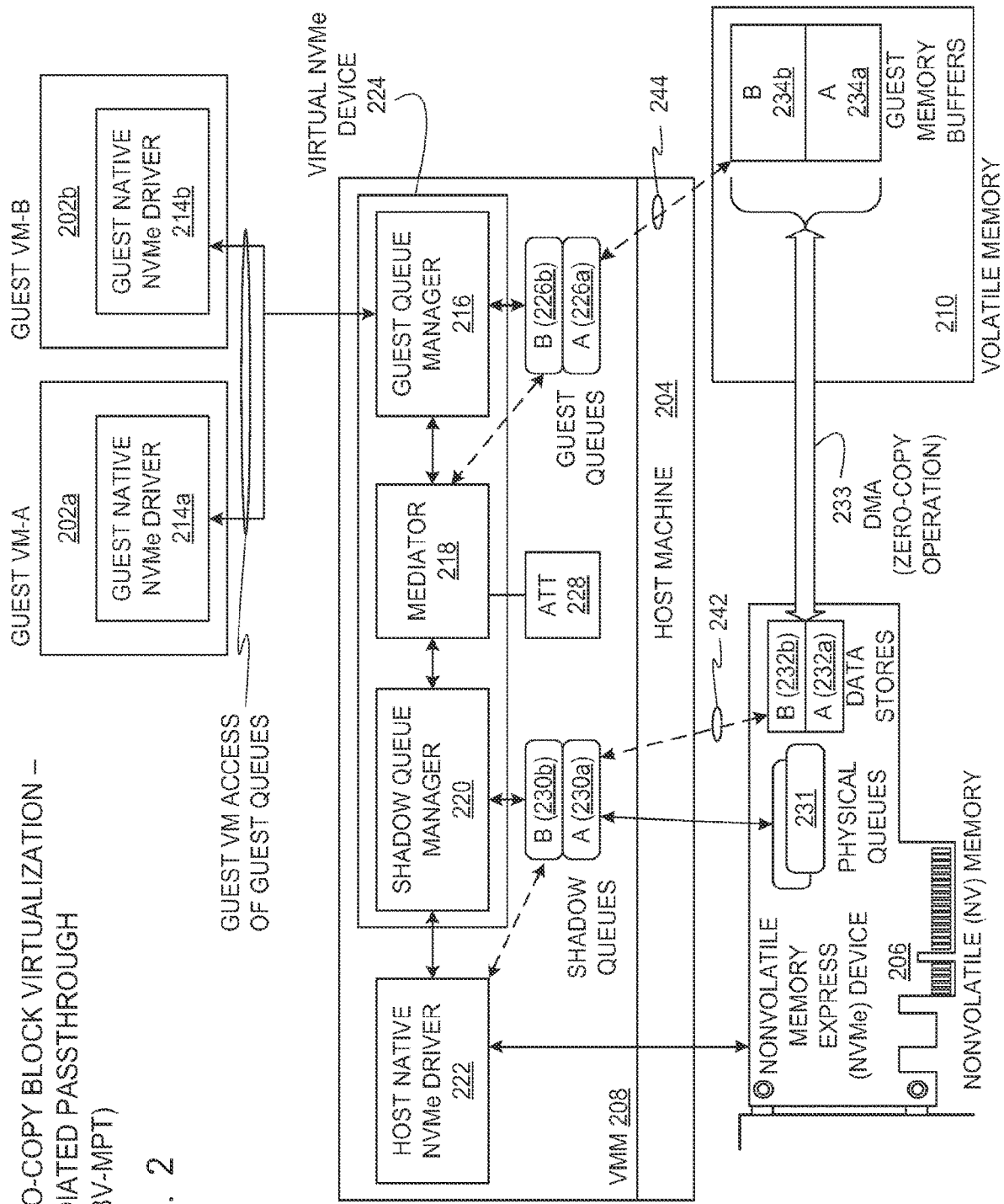
FIG. 2 illustrates a host machine implementing example zero-copy block virtualization—mediated passthrough (ZCBV-MPT) techniques to provide VMs with access to physical NV memory.

FIG. 2 illustrates example guest VMs (shown as guest VM-A 202a and guest VM-B 202b) and an example host machine 204 implementing example ZCBV-MPT techniques to provide the VMs 202a, 202b with access to example physical NV memory 206. Examples disclosed herein may be performed with any number of guest VMs. The example of FIG. 2 is described in connection with the physical NV memory 206 being implemented using an NVMe device 206. However, the example ZCBV-MPT techniques may alternatively be implemented in connection with other types of NV memories. The example ZCBV-MPT techniques improve data access performance without sacrificing sharing capabilities that enable use of a single physical NVMe device by multiple guest VMs. The example ZCBV-MPT techniques involves executing native NVMe device drivers in guest VMs and initiating direct memory access (DMA) copy operations for performance-critical I/O commands (e.g., data access requests). The example ZCBV-MPT techniques also intercept administrative commands that could impact global behavior across multiple guest VMs, that do not require handling by underlying physical hardware, and/or that do not require the same high-performance handling as performance-critical I/O commands. The example ZCBV-MPT techniques improve the performance of block I/O virtualization by using guest queues and corresponding shadow queues as described below. Laboratory tests of an example implementation of the ZCBV-MPT techniques show a 100+% performance improvement over prior I/O paravirtualization techniques.

In the illustrated example of FIG. 2, an example VMM 208 executes on the host machine 204. The example VMM 208 may be implemented using any suitable host OS and/or hypervisor. For example, the VMM 208 may be implemented using a host Linux/KVM OS. The example host machine 204 may be any physical computer or server. In the illustrated example, the host machine 204 includes or is in circuit with the NVMe device 206 and an example volatile memory 210. The example volatile memory 210 may be implemented using any suitable random access memory such as a dynamic random access memory (DRAM), a synchronous DRAM (SDRAM), a double data rate (DDR) SDRAM, a static RAM (SRAM), etc.

In the illustrated example, each guest VM 202a, 202b executes a corresponding guest native NVMe driver 214a, 214b. Also in the illustrated example, the VMM 208 executes an example guest queue manager 216, an example mediator 218, an example shadow queue manager 220, and an example host native NVMe driver 222. In the illustrated example, the NVMe drivers 214a, 214b, 222 are identified as native because the I/O function calls programmed therein are structured to interface directly with a physical hardware device such as the NVMe device 206 (e.g., directly with firmware of the NVMe device 206). In the illustrated example, the guest native NVMe drivers 214a, 214b are the same as the host native NVMe driver 222. As such, each of the native NVMe drivers 214a, 214b, 222 operates as if it is interfacing directly with the physical NVMe device 206 even though only the host native NVMe driver 222 interfaces directly with the physical NVMe device 206.

In the illustrated example, the guest queue manager 216, the mediator 218, and the shadow queue manager 220 implement a virtual NVMe device 224. The NVMe device 224 is identified as virtual because it appears to and interfaces with the guest native NVMe drivers 214a, 214b as if it were physical hardware. As such, when the guest native NVMe drivers 214a, 214b communicate with the NVMe device 224, the guest native NVMe drivers 214a, 214b behave as if they are communicating with physical hardware. However, the NVMe device 224 operates in the context of "knowing" that it is not physical hardware and that it does not directly access physical hardware (e.g., the NVMe device 206). In some examples, the virtual NVMe device 224 can be implemented using a quick emulator (QEMU) hosted hypervisor to perform hardware virtualization. The example virtual NVMe device 224 converts data access requests from the guest VMs 202a, 202b to data access requests suitable to be serviced by the NVMe device 206 to provide the guest VMs 202a, 202b with data requested from the NVMe device 206.

In other examples, the guest native NVMe drivers 214a, 214b and the host native NVMe driver 222 may instead be any other suitable native nonvolatile memory drivers, any other suitable native memory drivers, and/or any other suitable native hardware drivers corresponding to a physical resource in which data is being accessed. Also in other examples, the virtual NVMe device 224 may instead be any other suitable virtual nonvolatile memory, any other suitable virtual memory, and/or any other suitable virtual hardware corresponding to the physical resource in which data is being accessed. For example, although the corresponding physical resource of the illustrated example of FIG. 2 is the NVMe device 206, in other examples the corresponding physical resource may be any other type of nonvolatile memory, any other type of memory, and/or any other type of physical hardware resource suitable for use with examples disclosed herein. Examples disclosed herein may also be implemented in connection with other suitable interface standards in addition to or in instead of the NVMe interface standard. For example, techniques disclosed herein may be used with different types of bus interface standards (e.g., the SATAe bus interface protocol, the mSATA bus interface protocol, the SAS bus interface protocol, the AHCI bus interface protocol, etc.) to increase data transfer speeds associated with data access requests from guest VMs. For example, laboratory tests of examples disclosed herein show that data transfer speeds equal to or greater than 2000 megabytes per second (MB/s) can be achieved using examples disclosed herein with 3D crosspoint memory (e.g., implemented in Intel® Optane™ memories). As such, examples disclosed herein improve over prior techniques that read data from Intel® Optane™ memories at lower data transfer speeds (e.g., 1350 MB/s). In other implementations, example techniques disclosed herein may be used to improve data transfer speeds for guest VMs that access data in other types of memories and/or via other types of interface standards.

An advantage of emulating one or more physical resources using the virtual NVMe device 224 is that the guest native NVMe drivers 214a, 214b in the guest VMs 202a, 202b do not need to be modified to be or operate different from the host native NVMe driver 222. That is, the guest native NVMe drivers 214a, 214b can be the same as the host native NVMe driver 222 because the guest native NVMe drivers 214a, 214b operate as if they are interfacing directly with a physical NVMe device (e.g., the NVMe device 206) that is being emulated by the virtual NVMe device 224. As such, examples disclosed herein can be efficiently scaled across additional guest VMs by using native NVMe drivers (e.g., copies of the guest native NVMe drivers 214a, 214b and/or the host native NVMe driver 222) in such additional guest VMs without needing additional software and/or hardware development to customize NVMe drivers for such additional guest VMs.

The example guest queue manager 216 manages guest queues 226a, 226b corresponding to the guest VMs 202a, 202b. For example, to access data in the NVMe device 206, a guest VM 202a, 202b uses its guest native NVMe driver 214a, 214b to generate an I/O command that includes a data access request (e.g., a read and/or write request). In the illustrated example, the guest queues 226a, 226b are implemented using ring queues or circular queues. In other examples, any other suitable type of queue may be used instead. In the illustrated example, the data access request is based on guest physical memory addresses. That is, because the guest native NVMe drivers 214a, 214b operate as if they interface directly with the NVMe device 206, the guest native NVMe drivers 214a, 214b access data based on guest versions of physical memory addresses (e.g., guest physical memory addresses) that the guest native NVMe drivers 214a, 214b interpret as physical memory addresses of the NVMe device 206 even though the guest physical memory addresses are not the actual physical memory addresses of the NVMe device 206.

In the illustrated example, the guest queue manager 216 receives commands from the guest native NVMe drivers 214a, 214b of the guest VMs 202a, 202b, and submits them in corresponding ones of the guest queues 226a, 226b. The guest queues 226a, 226b of the illustrated example are implemented in memory mapped input/output (MMIO) registers of the VMM 208. However, any other registers and/or memory space may be used. The guest queue manager 216 of the illustrated example also operates as a scheduler to schedule when ones of the commands in the guest queues 226a, 226b are to be serviced by the example mediator 218. The example mediator 218 synchronizes the guest queues 226a, 226b and shadow queues 230a, 230b so that the host native NVMe driver 222 can provide commands from the shadow queues 230a, 230b to the NVMe device 206. In the illustrated example, to provide the commands to the NVMe device 206, the host native NVMe driver 222 synchronizes the shadow queues 230a, 230b with corresponding physical queues 231 in the NVMe device 206. In examples disclosed herein, the mediator 218 can perform such synchronization using trapping techniques and/or polling techniques. In the illustrated example, the shadow queues 230a, 230b and the physical queues 231 are implemented using ring queues or circular queues. In other examples, any other suitable type of queue may be used instead.

In example trapping techniques, the mediator 218 synchronizes the guest queues 226a, 226b and the shadow queues 230a, 230b by trapping submissions from the guest native NVMe drivers 214a, 214b to the guest queues 226a, 226b. In examples in which the guest queues 226a, 226b are implemented by MIMO registers, the submissions to the guest queues 226a, 226b are trapped by trapping commands submitted to the MMIO registers from the guest native NVMe drivers 214a, 214b.

In example polling techniques, the mediator 218 uses dedicated CPU cores/threads to poll the guest queues 226a, 226b for updates. In such examples, commands submitted to the guest queues 226a, 226b (e.g., MIMO registers) are not trapped. Instead, the example mediator 218 uses a RAM page to backup the guest MMIO register pages that implement the guest queues 226a, 226b. The RAM page may be implemented in the volatile memory 210 and/or using register space in the NVMe device 206. In this manner, when the guest native NVMe drivers 214a, 214b write to (e.g., submit commands to) or read from (e.g., read completion status entries from) the guest queues 226a, 226b, such interactions with the guest queues 226a, 226b are carried out directly with the RAM page. The example mediator 218 uses the monitoring thread to monitor the RAM page for changes, and takes action in response to detecting a change made by any of the guest native NVMe drivers 214a, 214b.

When the example mediator 218 traps commands submitted in the guest queues 226a, 226b or obtains the submitted commands based on polling, it emulates corresponding accesses to the physical hardware implemented by the example NVMe device 206 by translating the guest physical memory addresses of the commands in the guest queues 226a, 226b to commands based on host physical memory addresses. In the illustrated example, the host physical memory addresses are the actual physical memory addresses of the NVMe device 206. In the illustrated example, to perform address translations between the guest physical memory addresses and the host physical memory addresses, the mediator 218 includes and/or accesses an address translation table (ATT) 228. The example ATT 228 includes mappings of the host physical memory addresses to corresponding guest physical memory addresses. The example shadow queue manager 220 receives the translated commands from the example mediator 218 and places the translated commands in corresponding shadow queues 230a, 230b. The shadow queue manager 220 of the illustrated example also operates as a scheduler to schedule when ones of the translated commands in the shadow queues 230a, 230b are to be serviced by the host native NVMe driver 222. In some examples, the shadow queues 230a, 230b can be generated directly in the NVMe device 106.

The example host native NVMe driver 222 accesses ones of the translated commands from the shadow queues 230a, 230b and requests servicing of the commands by the NVMe device 206. In the illustrated example, the NVMe device 206 includes physical data stores 232a, 232b at separate host memory address ranges. Each physical data store 232a, 232b is allocated as a virtual data store resource to a corresponding one of the guest VMs 202a, 202b. As such, a translated I/O command that includes a data access request corresponding to guest VM-A 202a is handled by the host native NVMe driver 222 by requesting access to data in the data store A 232a. Similarly, a translated I/O command that includes a data access request corresponding to the guest VM-B 202b is handled by the host native NVMe driver 222 by requesting access to data in the data store B 232b.

In the illustrated example, to improve data access performance, the NVMe device 206 services data access requests from the host native NVMe driver 222 by performing a DMA operation 233 to copy requested data between corresponding ones of the physical data stores 232a, 232b and corresponding example guest memory buffers 234a, 234b. In this manner, bulk data transfer operations are offloaded from the CPU(s) of the host machine 204. For example, I/O commands including such data access requests also include physical memory addresses of the guest memory buffers 234a, 234b to/from which the DMA operation 233 should copy the requested data from/to the NVMe device 206. For example, if the I/O command is a data access request to read data from the NVMe device 206, the DMA operation 233 copies data from the NVMe device 206 to a corresponding one of the guest memory buffers 234a, 234b. Alternatively, if the I/O command is a data access request to write data to the NVMe device 206, the DMA operation 233 copies data to the NVMe device 206 from a corresponding one of the guest memory buffers 234a, 234b.

In the illustrated example, the DMA operation 233 results in a zero CPU cycle copy (zero-copy) operation because, the bulk data transfer between the NVMe device 206 and the guest memory buffers 234a, 234b is not handled by the CPU of the host machine 204 and, thus, puts no CPU cycle load on the host machine 204. In addition, the bulk data copy operation performed by the DMA operation 233 can be performed much faster than processing the copy operation by the CPU of the host machine 204.

In the illustrated example, each of the guest memory buffers 234a, 234b is allocated as a virtual memory resource to a corresponding one of the guest VMs 202a, 202b. In this manner, the guest VMs 202a, 202b can access requested data from the guest memory buffers 234a, 234b. In some examples, a subsequent I/O command from a guest VM 202a, 202b requesting to read and/or write data in the NVMe device 206 that has been previously copied to the guest memory buffers 234a, 234b is intercepted by the virtual NVMe device 224 without being forwarded to the shadow queues 230a, 230b, and the virtual NVMe device 224 provides the requested access to the data in the guest memory buffers 234a, 234b instead of re-requesting the data from the NVMe device 206. In this manner, because read/write speeds to volatile memory are typically faster than read/write speeds to NV memory, accesses to data already residing in the guest memory buffers 234a, 234b will be relatively faster than re-requesting the from the NVMe device 206. In addition, by intercepting such subsequent I/O commands requesting access to data already located in the guest memory buffers 234a, 234b, the virtual NVMe device 224 conserves resources of the NMVe device 206 to service other performance-critical data access requests. Thus, the virtual NVMe device 224 improves performance of data access requests by translating guest I/O commands and submitting the translated I/O commands to the shadow queues 230a, 230b when such I/O commands request data from the NVMe device 206 that is not available in the guest memory buffers 234a, 234b, and intercepts guest I/O commands that request data that is available in the guest memory buffers 234a, 234b without needing to request it from the NVMe device 206.

In the illustrated example, the mediator 218 uses the ATT 228 to translate between the host physical memory addresses and the guest physical memory addresses corresponding to the guest memory buffers 234a, 234b so that the virtual NVMe device 224 can provide the guest native NVMe drivers 214a, 214b with access to data in corresponding ones of the guest memory buffers 234a, 234b. A dashed line indicated by reference numeral 242 shows that the shadow queues 230a, 230b correspond to respective physical data stores 232a, 232b in the NVMe device 206. In addition, a dashed line indicated by reference numeral 244 shows that the guest queues 226a, 226b correspond to respective physical data stores 234a, 234b in the volatile memory 210.

Figure 3:
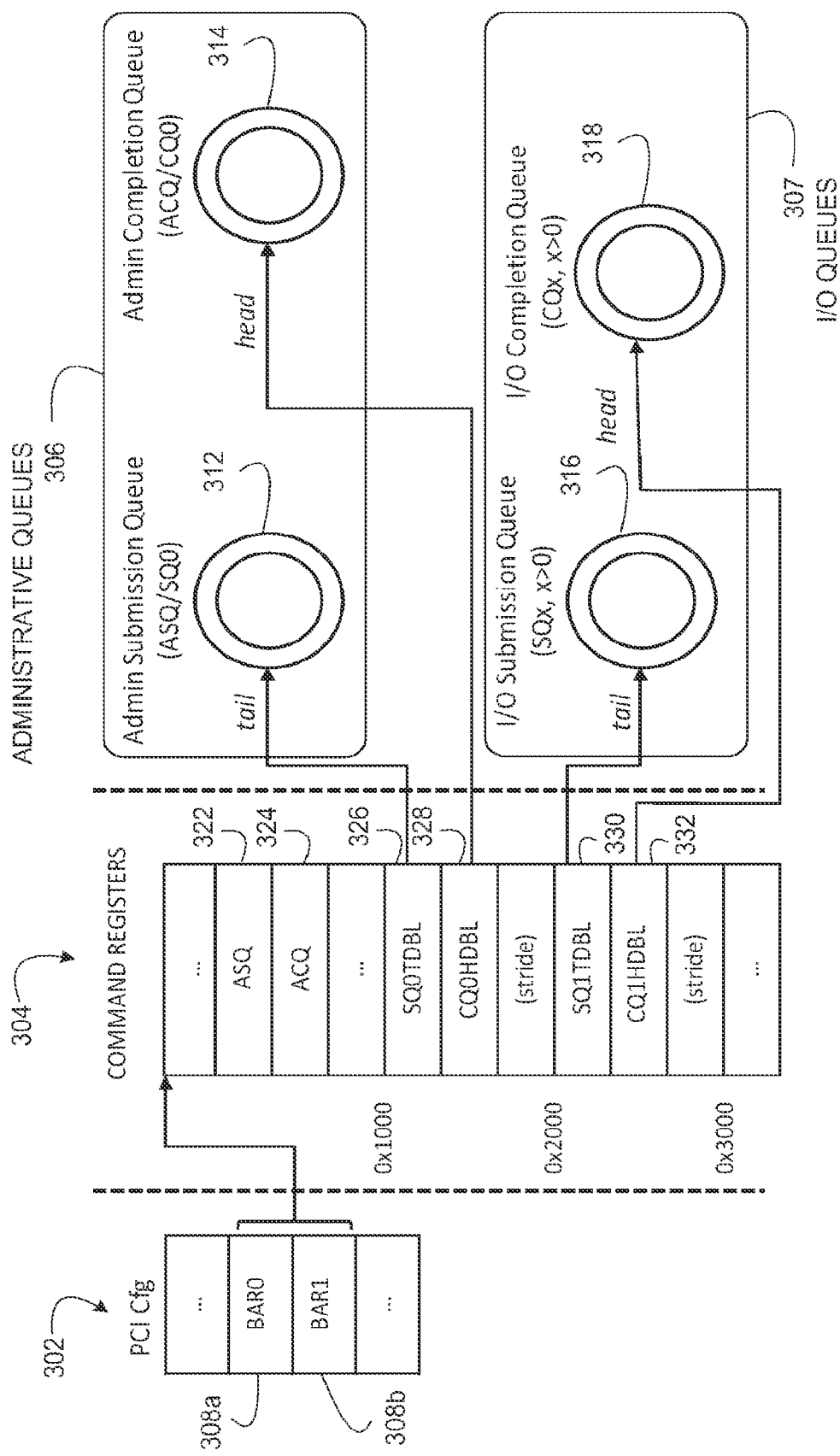
FIG. 3 is an example view of a nonvolatile memory express (NVMe) protocol over a peripheral component interconnect express (PCIe) bus that may be used to implement the example ZCBV-MPT techniques described in connection with FIG. 2.

FIG. 3 is an example view of a NVMe protocol over a PCIe bus that may be used to implement the example ZCBV-MPT techniques described in connection with FIG. 2. The example view shows example PCI configuration registers 302, example command registers 304, example administrative queues 306, and example I/O queues 307. The example PCI configuration registers 302, example command registers 304, the example administrative queues 306, and the example I/O queues 307 are accessed by the virtual NVMe device 224 of FIG. 2 to communicate with the host native NVMe driver 222 of FIG. 2. The PCI configuration registers 302 of the illustrated example store base address registers (BARs) corresponding to physical data stores in the NVMe device 206 of FIG. 2. For example, a BAR0 register 308a stores a lower half of the base memory address of the command registers 304 (e.g., the lower 32 bits of a 64-bit long memory address), and a BAR1 register 308b stores an upper half of the base memory address of the command registers 304 (e.g., the upper 32 bits of a 64-bit long memory address).

The example administrative queues 306 and the example I/O queues 307 are implemented using ring queues or circular queues. However, any other types of queues may be used instead. The guest queues 226a, 226b, the shadow queues 230a, 230b, and the physical queues 231 of FIG. 2 include administrative queues similar in structure to the example administrative queues 306 and include I/O queues similar in structure to the example I/O queues 307. The administrative queues 306 of the illustrated example include a submission queue 0 (SQ0) of an administrative submission queue (ASQ) (i.e., ASQ/SQ0 312) and a completion queue (CQ0) of an administrative completion queue (ACQ) (i.e., ACQ/CQ0 314). The example I/O queues 307 may implement the shadow queues 230a, 230b of FIG. 2 and are similar in structure to the guest queues 226a, 226b. The I/O queues 307 of the illustrated example include an I/O submission queue 316 and an I/O completion queue 318.

The example command registers 304, the administrative queues 306, and the I/O queues 307 are implemented using MMIO registers. However, any other type of register and/or memory space may be used instead. The command registers 304 of the illustrated example include addresses and/or doorbells (DBL) for submitting commands to the administrative queues 306 and/or to the I/O queues 307 to implement the example ZCBV-MPT techniques. For example, the command registers 304 store an ASQ memory address 322 at which the ASQ/SQ0 312 starts and an ACQ memory address 324 at which the ASQ/CQ0 314 starts. For administrative queues implemented in the guest queues 226a, 226b, the ASQ memory address 322 and the ACQ memory address 324 are virtual memory addresses. For administrative queues implemented in the shadow queues 230a, 230b and the physical queues 231, the ASQ memory address 322 and the ACQ memory address 324 are physical memory addresses. Although not shown, the command registers 304 also store other information to facilitate other device functions.

In the illustrated example, an SQ0 doorbell (DBL) tail (SQ0TDBL) 326 in the control registers 304 stores a tail index value of the ASQ/SQ0 312. In examples disclosed herein, a DBL operates as a queue change notification to notify that a change has been made to a queue. The virtual NVMe device 224 can write administrative commands to the tail of the ASQ/SQ0 312 based on the SQ0TDBL 326. Writing to the tail of the ASQ/SQ0 312 submits the administrative command to the host native NVMe driver 222. In the illustrated example, a CQ0 doorbell (DBL) head (CQ0HDBL) 328 in the control registers 304 stores a head index value of the ASQ/CQ0 314. The virtual NVMe device 224 can read a completion status of an administrative command from the head of the ASQ/CQ0 314 based on the CQ0HDBL 328. In addition, the virtual NVMe device 224 writes to the head of the ASQ/CQ0 314 to notify the host native NVMe driver 222 that the virtual NVMe device 224 has read the completion status. When implemented in the guest queues 226a, 226b, the SQ0TDBL 326 is a virtual tail index value of a guest administrative submission queue similar to the ASQ/SQ0 312, and the CQ0HDBL 328 is a virtual head index value of a guest administrative completion queue similar to the ASQ/CQ0 314. When implemented in the shadow queues 230a, 230b and in the physical queues 231, the SQ0TDBL 326 is a physical tail index value of a shadow or physical administrative submission queue similar to the ASQ/SQ0 312, and the CQ0HDBL 328 is a physical head index value of a shadow or physical administrative completion queue similar to the ASQ/CQ0 314.

In the illustrated example, an SQ1 doorbell (DBL) tail (SQ1TDBL) 330 in the control registers 304 stores a tail index value of the I/O submission queue 316. The virtual NVMe device 224 can write I/O commands (e.g., data access requests) to the tail of the I/O submission queue 316 based on the SQ1TDBL 330. Writing to the tail of the I/O submission queue 316 submits the I/O command to the host native NVMe driver 222. In the illustrated example, a CQ1 doorbell (DBL) head (CQ1HDBL) index value 332 in the control registers 304 stores a head memory address of the I/O completion queue 318. The virtual NVMe device 224 can read a completion status of an I/O command from the head of the I/O completion queue 318 based on the CQ1HDBL memory address 332. In addition, the virtual NVMe device 224 writes to the head of the I/O completion queue 318 to notify the host native NVMe driver 222 that the virtual NVMe device 224 has read the completion status. When implemented in the guest queues 226a, 226b, the SQ1TDBL 330 is a virtual tail index value of a guest I/O submission queue similar to the I/O submission queue 316, and the CQ1HDBL 332 is a virtual head index value of a guest I/O completion queue similar to the I/O completion queue 318. When implemented in the shadow queues 230a, 230b and in the physical queues 231, the SQ1TDBL 330 is a physical tail index value of a shadow or physical I/O submission queue similar to the I/O submission queue 316, and the CQ1HDBL 332 is a physical head index value of a shadow or physical I/O completion queue similar to the I/O completion queue 318.

Figure 4:
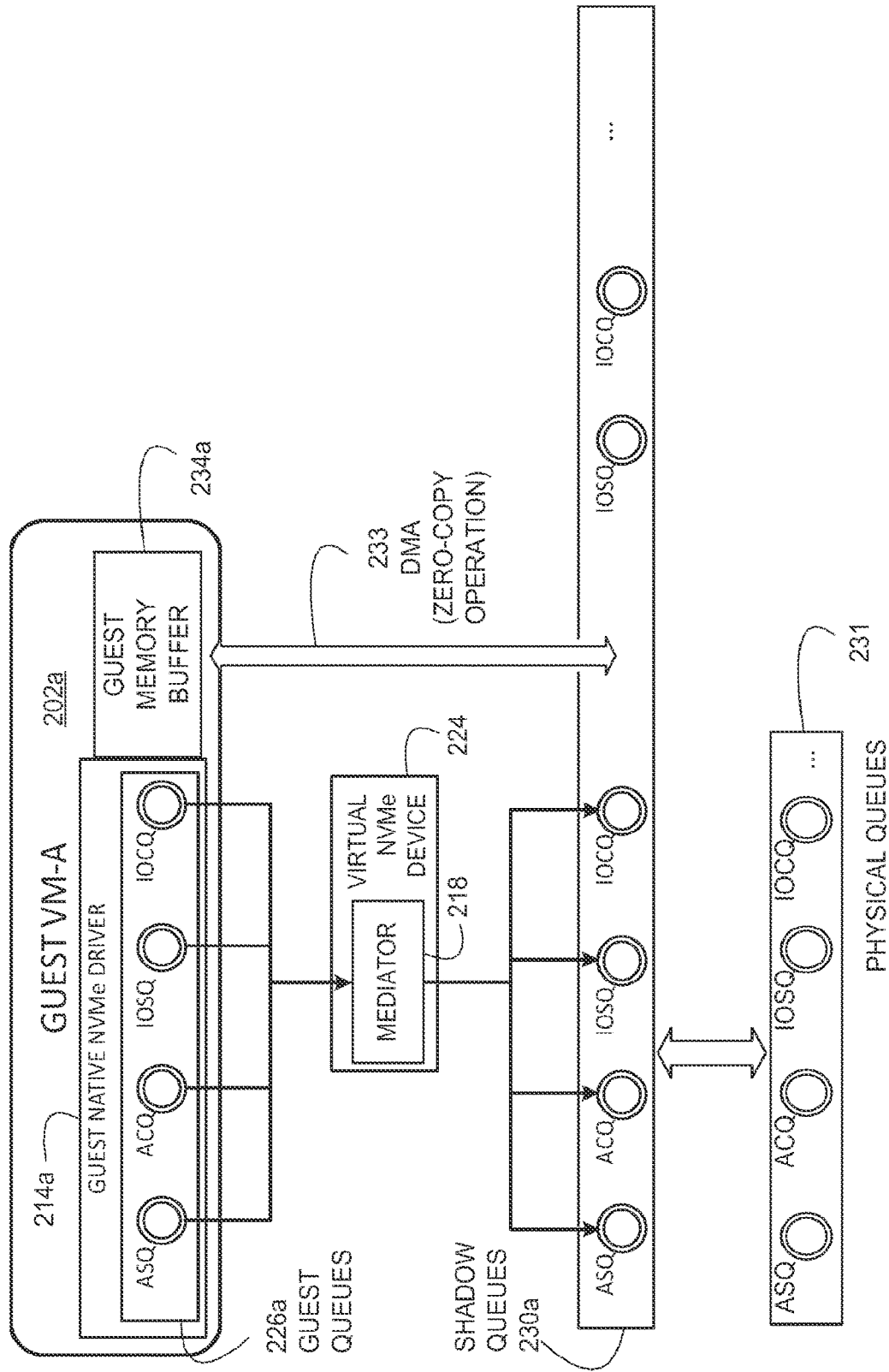
FIG. 4 shows the example mediator and the example virtual NVMe device of FIG. 2 that facilitate performing a zero-copy operation based on the example ZCBV-MPT techniques described in connection with FIG. 2.

FIG. 4 shows the example mediator 218 and the example virtual NVMe device 224 of FIG. 2 that facilitate performing a DMA data transfer (e.g., a zero-copy operation) based on the example ZCBV-MPT techniques described above in connection with FIG. 2. In the illustrated example of FIG. 4, the guest VM-A 202a is shown with the guest native NVMe driver 214a and a representative view of the corresponding guest queues 226a accessed by the guest native NVMe driver 214a. The illustrated example of FIG. 4 also shows corresponding shadow queues 230a. The shadow queues 230a of the illustrated example are mapped to physical queues 231 located in the NVMe device 206 (FIG. 2). For example, when the shadow queue manager 220 makes a change to the shadow queues 230a, the host native NVMe driver 222 (FIG. 2) propagates or synchronizes the change to the physical queues 231.

In the illustrated example, the guest queues 226a, the shadow queues 230a, and the physical queues 231 include administrative queues (e.g., ASQ, ACQ) and I/O queues (IOSQ, IOCQ). Administrative queues are used for administrative commands to manage the virtual NVMe device 224, manage queues, obtain/set driver configuration information, etc. I/O queues are used for I/O commands such as data access requests to access data in the NVMe device 206 (FIG. 2). The administrative queues are shared by all VMs hosted on the host machine 204 (FIG. 2). The size of a physical administrative queue can be different from the sizes of its corresponding guest administrative queues. The I/O queues are statically partitioned into multiple groups, and each group is assigned for exclusive use by a corresponding VM. In addition, one I/O queue of the physical queues 231 uniquely corresponds in a one-to-one manner to one shadow I/O queue of the shadow queues 230a and one guest I/O queue of the guest queues 226a. In addition, the physical I/O queue and its corresponding shadow and guest I/O queues are of the same size.

Administrative queues are used to manage the NVMe device 206. For example, if the guest VM 202a wants to use the virtual NVMe device 224, the guest VM 202a sends a message to an administrative queue (e.g., an ASQ of the guest queues 226a) to obtain capabilities of virtual NVMe device 224. In examples disclosed herein, to conserve resources of underlying physical hardware (e.g., the NVMe device 206) to better handle performance-critical I/O commands, the guest queue manager 216 (FIG. 2) processes administrative commands in the guest queues 226a to determine which administrative commands need to be forwarded to the shadow queues 230a (and, thus, the physical queues 231), and which administrative commands can be intercepted and handled by the virtual NVMe device 224 without being forwarded to the shadow queues 230a. This determination is made based on the type of administrative command. For example, two types of administrative commands are mandatory commands and optional commands (e.g., virtual asynchronous events). Optional commands, or virtual asynchronous events, do not have an effect on a physical device (e.g., they are not intended to be completed by the NVMe device 206) and, thus, are not forwarded from the guest queues 226a to the shadow queues 230a and the physical queues 231. An example of an optional command is an 'identify' command, which the guest VM 202a can use to request an identity of the virtual NVMe device 224. For commands that do impact physical device operation (e.g., accessing (changing/requesting) a configuration of the physical device not known by the virtual NVMe device 224), the guest queue manager 216 forwards those commands to administrative queues (e.g., ASQs) of the shadow queues 230a and the physical queues 231. However, before it forwards an administrative command, the mediator 218 performs a translation as described below in connection with FIGS. 5 and 6 to ensure the administrative command is safe (e.g., ensures that the administrative command does not interfere in the administrative queue of the physical queues 231 with a command from another guest queue of another VM such as the guest VM 202b of FIG. 2). For example, if the administrative command is "delete I/O Queue," the mediator 218 confirms that the I/O queue to be deleted belongs to the guest queue 226a that is sending the delete command. If not, it is possible that an I/O queue of another guest VM might be deleted. As such, the mediator 218 intercepts the "delete I/O queue" administrative command without forwarding it to the shadow queues 230a and the physical queues 231.

In the illustrated example, the mediator 218 translates commands from the guest queues 226a and copies the translated commands to the shadow queues 230a. To translate the commands from the guest queues 226a to the shadow queues 230a, the mediator 218 translates virtual parameters (e.g., virtual memory addresses of data to be accessed, virtual queue identifiers of the guest queues 226a, 226b, etc. used by virtualized resources such as the guest VMs 202a, 202b) to physical parameters (e.g., physical memory addresses of the data to be accessed, physical queue identifiers of the shadow queues 230a, 230b and/or the physical queues 231, etc. used by physical resources such as the NVMe device 206). In the illustrated example, the mediator 218 translates guest physical memory addresses (GPAs) to host physical memory addresses (HPAs). The example GPAs are emulated physical memory addresses corresponding to the virtual NVMe device 224 so that the virtual NVMe device 224 operates as if it is an actual physical device. The example GPAs are used as the emulated physical memory addresses of data to be accessed when the guest native NVMe driver 214a specifies data to be accessed in the NVMe device 206. The example HPAs are used by the host native NVMe driver 222 to specify actual physical locations of the data in the NVMe device 206. For example, the mediator 218 may translate a command from the guest queues 226a by performing an example virtual-to-guest physical memory address translation and an example guest physical-to-host physical memory address translation. The example virtual-to-guest physical memory address translation involves the mediator 218 translating a virtual memory address of data to be accessed to a corresponding GPA corresponding to the virtual NVMe device 224. The example guest physical-to-host physical memory address translation involves the mediator 218 translating the GPA to a corresponding HPA for use by the NVMe device 206. The example mediator 218 also translates guest logical block addresses (GLBAs) to host logical block addresses (HLBAs). The GLBAs are used by the guest native NVMe driver 214a to specify logical addresses of data. The HLBAs are used by the host native NVMe driver 222 to specify logical addresses of data. The example mediator 218 also translates guest queue identifiers (GQIDs) (e.g., virtual queue identifiers of the guest queues 226a, 226b) to host queue identifiers (HQIDs) (e.g., physical queue identifiers of the shadow queues 230a, 230b and/or the physical queues 231). The GQIDs are used by the guest native NVMe driver 214a to specify the guest queues 226a. The HLBAs are used by the host native NVMe driver 222 to specify the shadow queues 232a. The mediator 218 may also perform translations of one or more additional or alternative parameters. In the illustrated example, the mediator 218 and the shadow queue manager 220 work together to create shadow queues 230a to submit new translated commands to the NVMe device 206. In the illustrated example of FIG. 4, translated I/O commands (e.g., translated data requests) in the shadow queues 230a are processed by the host native NVMe driver 222 as described above in connection with FIG. 2 to cause the NVMe device 206 of FIG. 2 to perform the DMA operation 233 (e.g., a zero-copy operation) to copy data between the NVMe device 206 and the guest memory buffer 234a of the requesting guest VM 202a.

Figure 5:
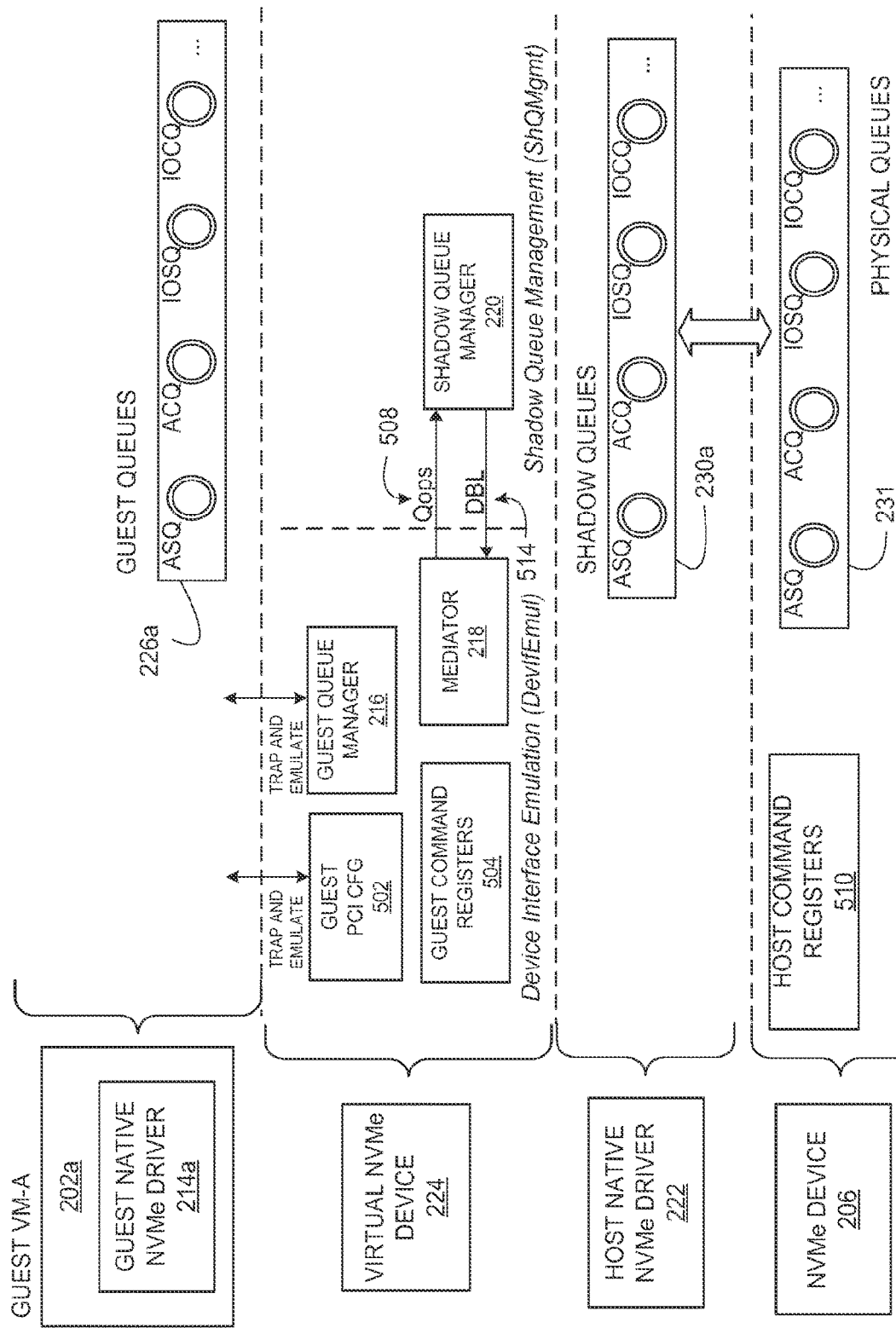
FIG. 5 shows the example virtual NVMe device of FIG. 2 emulating a PCI configuration and managing guest queues for the example guest VM of FIG. 2 to implement the example ZCBV-MPT techniques described in connection with FIG. 2.

FIG. 5 shows the example virtual NVMe device 224 of FIG. 2 emulating a PCI configuration and managing the guest queues 226a for the example guest VM-A 202a of FIG. 2 to implement the example ZCBV-MPT techniques. In the illustrated example of FIG. 5, the virtual NVMe device 224 manages a guest PCI configuration 502 and guest command registers 504. The guest PCI configuration 502 of the illustrated example is similar in structure and operation to the PCI configuration 302 of FIG. 3. However, in the example of FIG. 5, the guest PCI configuration 502 is emulated by the virtual NVMe device 224 to serve as a virtual PCI interface for the guest native NVMe driver 214a of the guest VM 202a. For example, the guest PCI configuration 502 includes BARs that the guest native NVMe driver 214a interprets as base address registers of the command registers 304. In this manner, requests made by the guest native NVMe driver 214a for access to a PCI bus are trapped by the virtual NVMe device 224, which uses the guest PCI configuration 502 to emulate access to the PCI bus for the guest native NVMe driver 214a.

The guest command registers 504 are similar in structure and operation to the command registers 304 described above in connection with FIG. 3. However, the guest command registers 504 are emulated by the virtual NVMe device 224 for use by the guest queue manager 216 and the guest native NVMe driver 214a to access the guest queues 226a. In this manner, commands written to the guest queues 226a are trapped by the virtual NVMe device 224 to emulate access to underlying physical resources such as the NVMe device 206 of FIG. 2. In the illustrated example, the mediator 218 dispatches translated commands from the guest queues 226a to the shadow queues 230a. This is shown in the example of FIG. 5 as the mediator 218 sending Qops notifications 508 to the shadow queue manager 220. In this manner, the host native NVMe driver 222 can service the commands from the shadow queues 230a. In the illustrated example, the host native NVMe driver 222 uses host command registers 510 to identify the memory mapped locations of the physical queues 231 so that the NVMe driver 222 and the NVMe device 206 can service the commands synchronized to the physical queues 231.

When the host native NVMe driver 222 completes a command, the host native NVMe driver 222 writes the completion to the shadow queues 230a. In this manner, the shadow queue manager 220 sends a DBL notification 514 to the mediator 218 in response to the completion being written to the shadow queue 230a. The example mediator 218 translates the completion queue entry from the shadow queues 230a and writes the translated completion queue entry to the guest queues 226a. The example guest native NVMe driver 214a than accesses the translated completion queue entry from the guest queues 226a. For example, the completion queue entry may indicate to the guest native NVMe driver 214a that data requested from the NVMe device 206 is stored in the memory buffer 234a of FIG. 2 corresponding to the guest VM 202a.

Figure 6:
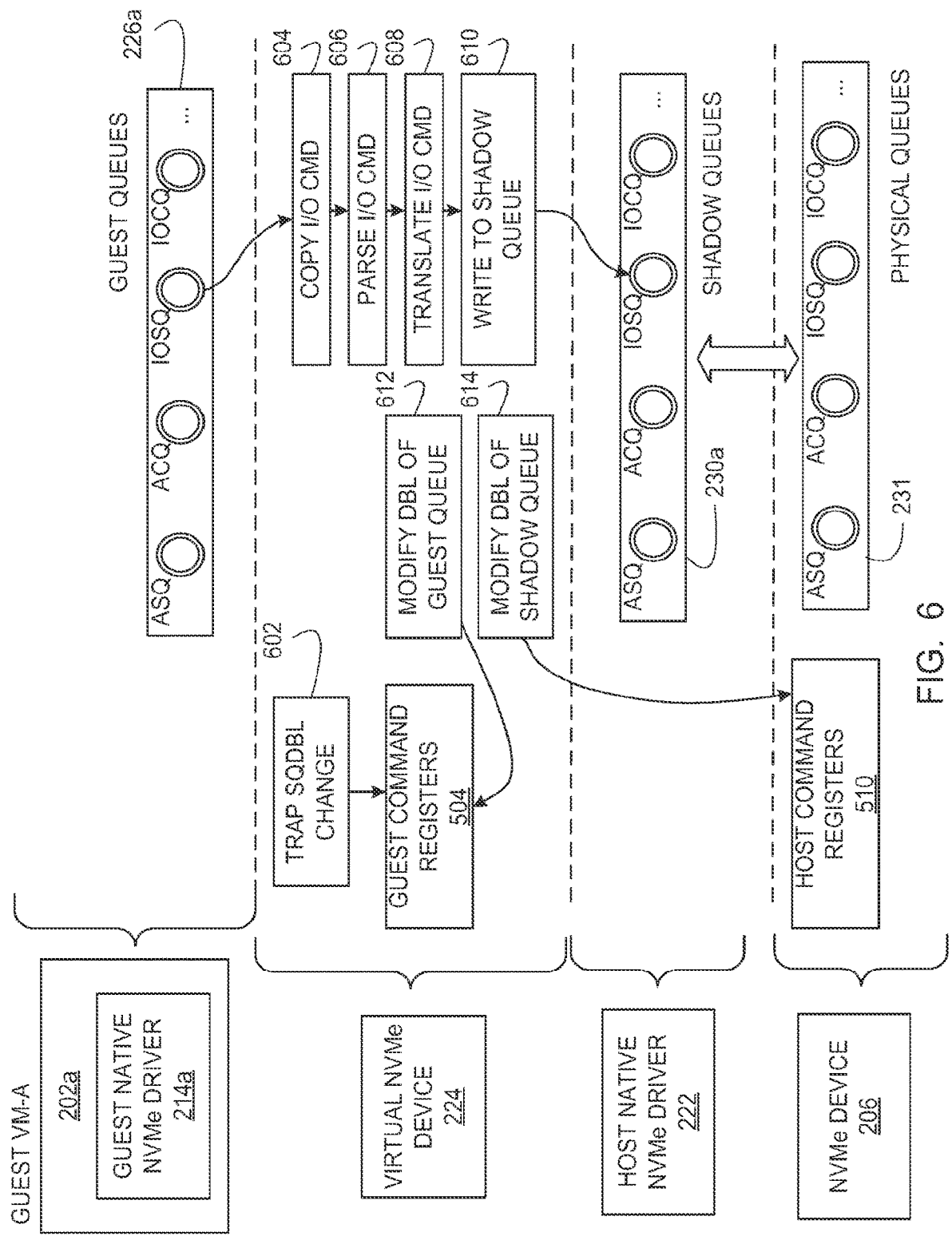
FIG. 6 shows the example virtual NVMe device of FIG. 2 managing the example shadow queues of FIG. 2 based on I/O command submissions to the example guest queues of FIG. 2 to implement the example ZCBV-MPT techniques described in connection with FIG. 2.

FIG. 6 shows the example virtual NVMe device 224 of FIG. 2 managing the example shadow queues 230a and the example guest queues 226a of FIG. 2 based on I/O commands (e.g., data access requests) submitted to the example guest queues 226a of FIG. 2 to implement the example ZCBV-MPT techniques disclosed herein. Although the example of FIG. 6 is described in connection with processing I/O commands, similar operations may be used to process administrative commands. The example of FIG. 6 may be used to service I/O commands (e.g., requests to access data in the NVM he device 206 FIG. 2) written to the guest queues 226a by the guest VM 202a. The example of FIG. 6 shows a number of blocks representing operations performed by the virtual NVMe device 224. The example blocks are representative of machine readable instructions that may be executed by one or more processors (e.g., the processor(s) 1312 of FIG. 13) to implement the corresponding operations. In the illustrated example, the guest queue manager 216 (FIG. 2) traps a change to a submission queue DBL (SQDBL) entry (block 602). For example, the SQDBL entry serves as a notification that the guest native NVMe driver 214a has added an I/O command to a guest queue 226a.

The example guest queue manager 216 copies the I/O command from an I/O submission queue (IOSQ) of the guest queues 226a (block 604). The example mediator 218 (FIG. 2) parses the I/O command (block 606). For example, the mediator 218 identifies an address portion of the I/O command that includes the GPA, the GLBA, the GQID, etc. The example mediator 218 translates the I/O command (block 608). For example, the mediator 218 converts the GPA to an HPA, the GLBA to an HLBA, the GQID to an HQID, etc. The shadow queue manager 220 (FIG. 2) writes the translated I/O command to the shadow queues 230a (block 610). For example, the shadow queue manager 220 writes the translated I/O command to a corresponding IOSQ identified by the HQID of the shadow queues 230a. The guest queue manager 216 modifies a DBL register value of a corresponding one of the guest queues 226a (block 612). For example, the guest queue manager 216 modifies a DBL register value corresponding to the IOSQ of the guest queues 226a to confirm that the I/O command located therein has been synchronized with the shadow queues 230a. The shadow queue manager 220 modifies a DBL register value of a corresponding one of the physical queues 231 (block 614). For example, the shadow queue manager 220 modifies a DBL register value corresponding to the IOSQ of the physical queues 231 to confirm that the I/O command located therein has been synchronized with the guest queues 226a.

Figure 7:
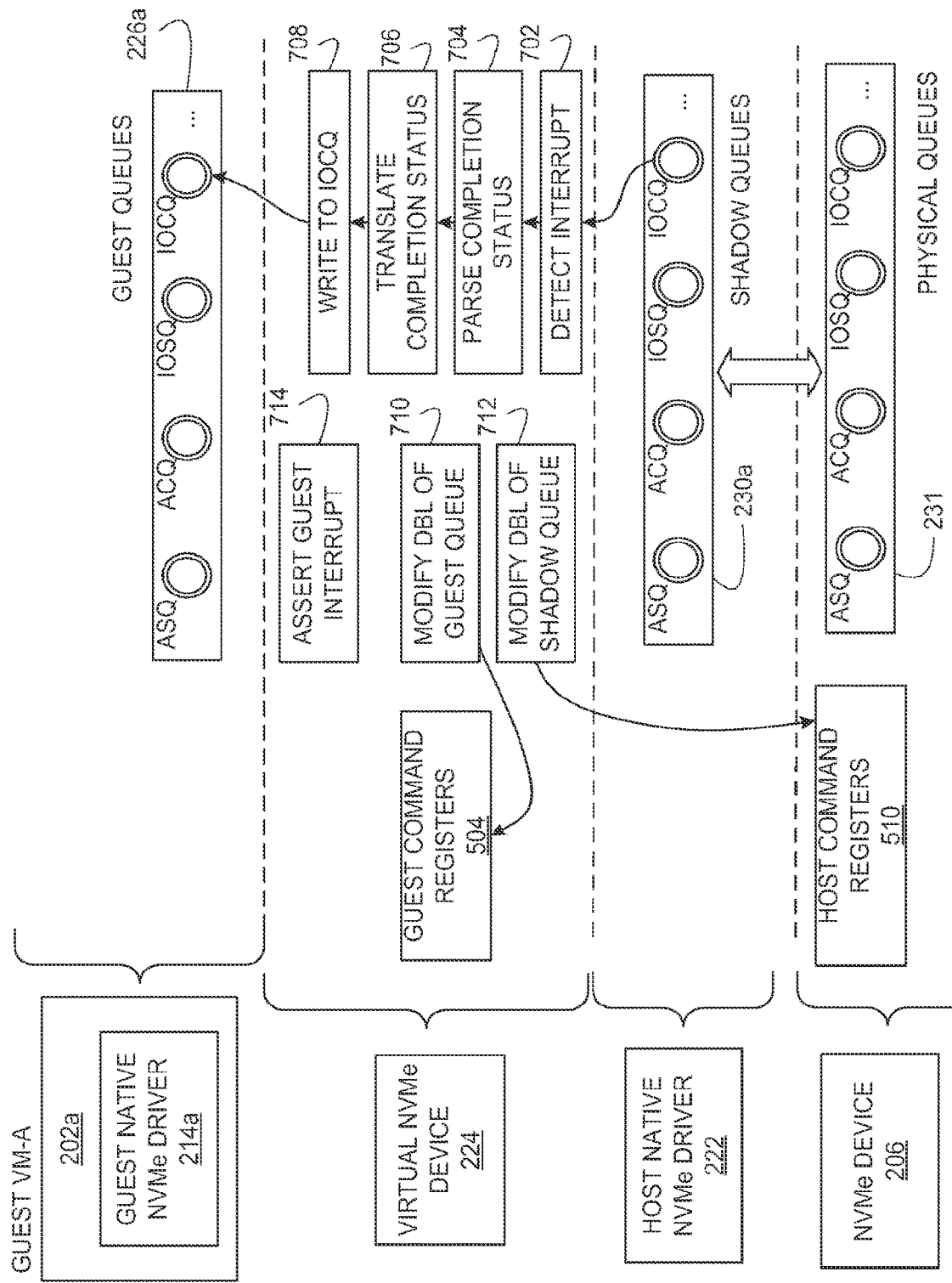
FIG. 7 shows the example virtual NVMe device of FIG. 2 managing the example shadow queues and the example guest queues of FIG. 2 based on completed I/O commands to implement the example ZCBV-MPT techniques described in connection with FIG. 2.

FIG. 7 shows the example virtual NVMe device 224 of FIG. 2 managing the example shadow queues 230a and the example guest queues 226a of FIG. 2 based on completion status entries submitted to the shadow queues 230a indicative of completed I/O commands (e.g., data access requests) to implement the example ZCBV-MPT techniques disclosed herein. Although the example of FIG. 7 is described in connection with processing I/O commands, similar operations may be used to process administrative commands. The example of FIG. 7 may be used after an I/O command is handled by the example process described above in connection with FIG. 6. For example, if the I/O command is a request to access data (e.g., read/write data) in the NVMe device 206 of FIG. 2, the example of FIG. 7 is used to notify the guest VM 202a when the I/O command is complete. For example, if the I/O command is a data access request to read data from the NVMe device 206, upon completion of the I/O command, the guest VM 202a can access the requested data in its guest memory buffer 234a (FIG. 2). Alternatively, if the I/O command is a data access request to write data to the NVMe device 206, completion of the I/O command notifies the guest VM 202a that it's I/O command resulted in a successfully write to the NVMe device 206. The example of FIG. 7 shows a number of blocks representing operations performed by the virtual NVMe device 224. The example blocks are representative of machine readable instructions that may be executed by one or more processors (e.g., the processor(s) 1312 of FIG. 13) to implement the corresponding operations.

In the illustrated example, after completion of the example DMA operation 233 (FIGS. 2 and 4), the shadow queue manager 220 (FIG. 2) detects an interrupt (block 702) in response to the host native NVMe driver 222 submitting a completion status to an IOCQ of the shadow queues 230a. For example, the completion status is generated by the host native NVMe driver 222 to indicate that an I/O command has been serviced and completed. The example mediator 218 (FIG. 2) parses the completion status entry (block 704). For example, the mediator 218 identifies an address portion of the completion status entry that includes the HPA, the HLBA, the HQID, etc. The example mediator 218 translates the completion status entry (block 706). For example, the mediator 218 converts the HPA to a GPA, the HLBA to a GLBA, the HQID to a GQID, etc. The guest queue manager 216 (FIG. 2) writes the translated completion status entry to an IOCQ of the guest queues 226a (block 708). For example, the guest queue manager 216 writes the translated completion status entry to a corresponding IOCQ identified by the GQID of the guest queues 226a. The guest queue manager 216 modifies a DBL register value of a corresponding one of the guest queues 226a (block 710). For example, the guest queue manager 216 modifies a DBL register value corresponding to the IOCQ of the guest queues 226a to confirm that the completion status entry located therein has been synchronized with the shadow queues 230a. The shadow queue manager 220 modifies a DBL register value of a corresponding one of the physical queues 231 (block 712). For example, the shadow queue manager 220 modifies a DBL register value corresponding to the IOCQ of the physical queues 231 to confirm that the completion status entry located therein has been synchronized with the guest queues 226a. In the illustrated example, the guest queue manager 216 asserts a guest interrupt (block 714). For example, if interrupts are enabled for the guest VM 202a, the guest queue manager 216 uses such a guest interrupt to notify the guest native NVMe driver 214a that an I/O command has been completed.

FIG. 8 shows example machine readable instructions that may be executed to define interfaces of the virtual NVMe device 224 of FIGS. 2 and 4-6 to implement the example ZCBV-MPT techniques disclosed herein. In the illustrated example of FIG. 8, a physical resource definition section 802 defines the physical parameters of the NVMe device 206 (FIG. 2) to be allocated to the virtual NVMe device 224. For example, the physical resource definition section 802 defines the start of the physical LBA (e.g., the start of the HLBA), a number of sectors, and a sector size. Also in the example of FIG. 8, a queue mapping section 804 defines mappings between the shadow queues 230a, 230b and corresponding ones of the physical queues 231 (FIGS. 2 and 4-7).

FIG. 9 shows example machine readable instructions that may be executed to define functions of the virtual NVMe device 224 of FIGS. 2 and 4-6 to implement the example ZCBV-MPT techniques disclosed herein. For example, the functions include a shadow completion queue create function 902 for use by the virtual NVMe device 224 to create shadow completion queues (e.g., IOCQ or ACQ) when completion status entries are generated by the NVMe device 206 (FIG. 2) in the physical queues 231 (FIGS. 2 and 4-7). The example functions also include a shadow submission queue create function 904 for use by the virtual NVMe device 224 to create shadow submission queues (e.g., IOSQ or ASQ) when commands (e.g., I/O commands or administrative commands) are submitted by the guest native NVMe driver 214a, 214b (FIG. 2) to the shadow queues 226a, 226b (FIG. 2). The example functions also include a shadow completion queue delete function 906 for use by the virtual NVMe device 224 to delete shadow completion queues (e.g., IOCQ or ACQ) when completion status entries are retrieved by the virtual NVMe device 224 from the shadow queues 226a, 226b. The example functions also include a shadow submission queue delete function 908 for use by the virtual NVMe device 224 to delete shadow submission queues (e.g., IOSQ or ASQ) when commands (e.g., I/O commands or administrative commands) have been processed/completed by the NVMe device 206. The example functions also include a shadow completion queue submit function 910 for use by the virtual NVMe device 224 to translate and copy completion queue entries from the shadow queues 226a, 226b to the guest queues 226a, 226b.

Figure 10:
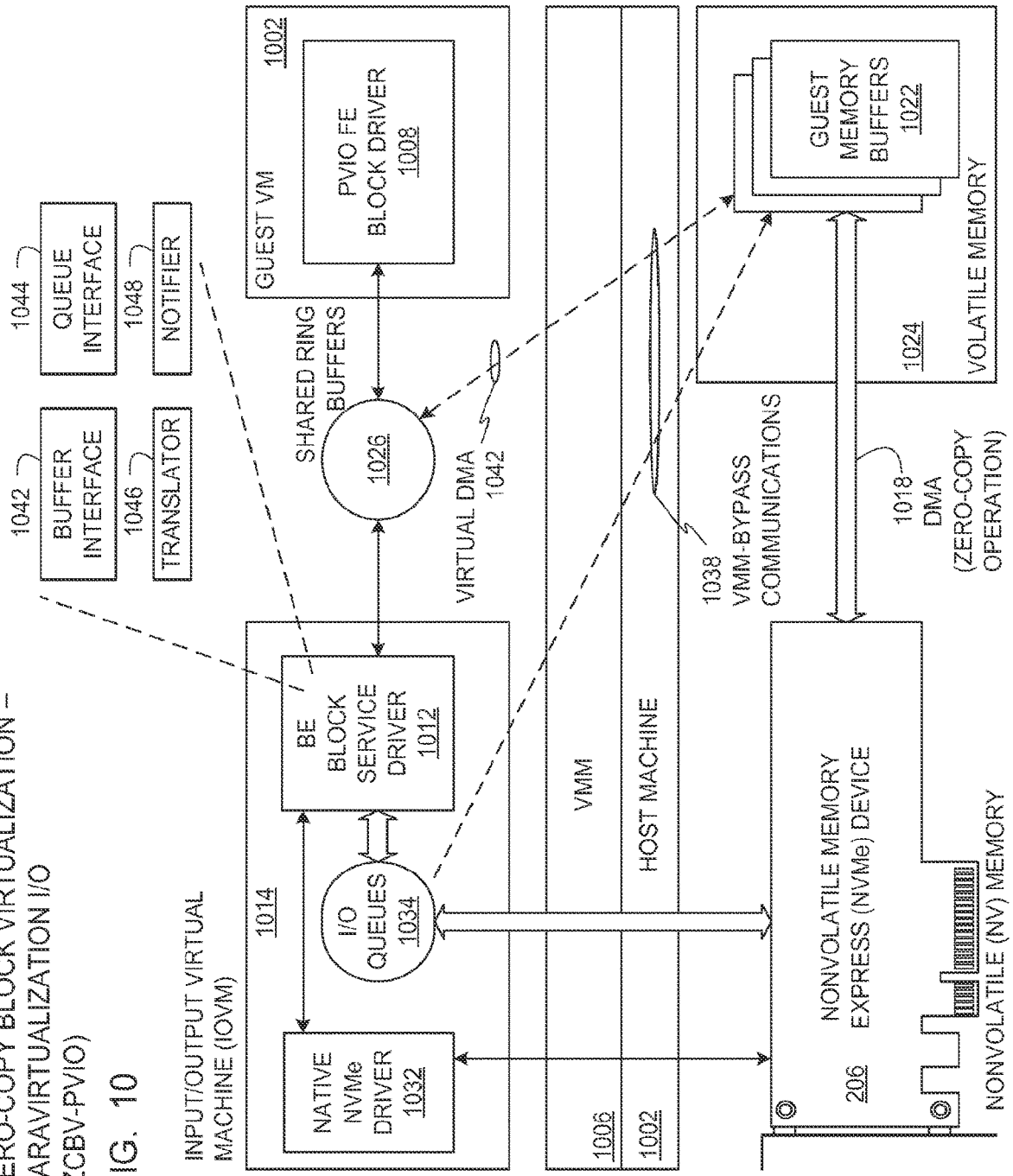
FIG. 10 illustrates a host machine implementing example zero-copy block virtualization—paravirtualization I/O (ZCBV-PVIO) techniques to provide VMs with access to physical NV memory.

FIG. 10 illustrates a host machine 1002 implementing example ZCBV-PVIO techniques to provide VMs (e.g., a guest VM 1004) with access to physical NV memory shown as the example NVMe device 206. In the illustrated example, the host machine 1002 executes an example VMM 1006, which may be implemented using a host Linux/KVM OS or any other suitable host OS or hypervisor. However, the example ZCBV-PVIO techniques disclosed herein bypass the VMM 1006 to provide faster accesses to the NVMe device 106 than can be achieved using prior virtualization techniques of accessing NV storage. The example ZCBV-PVIO techniques of FIG. 10 involve executing a PVIO FE block driver 1008 in the guest VM 1002, and executing a BE block service driver 1012 in an IOVM 1014 to achieve zero-copy data transfers using DMA operations 1018 between the NVMe device 206 and guest memory 1022 located in volatile memory 1024.

In the illustrated example of FIG. 10, the PVIO FE block driver 1008 may be implemented using any suitable PVIO FE block driver having an interface optimized with virtualization. The example PVIO FE block driver 1008 uses shared ring buffers 1026 (or circular buffers) to communicate between the guest VM 1002 and the IOVM 1014. However, any other type of buffer may be used instead. In the illustrated example, the shared ring buffers 1026 are created in system memory (e.g., the system memory of the host machine 1002). However, they may be created in any other memory in other examples. The shared ring buffers 1026 of the illustrated example include I/O operation descriptors to specify a memory address space in a corresponding one of the guest memory buffers 1022 to/from which the DMA operation 1018 is to copy data (e.g., perform a bulk data transfer) from/to the NVMe device 206.

In the illustrated example of FIG. 10, the BE block service driver 1012 receives a virtual interrupt request (IRQ) notification from the shared ring buffers 1026 indicating that the PVIO FE block driver 1008 has submitted an I/O request to the shared ring buffers 1026. In other examples, the PVIO FE block driver 1008 may instead poll the shared ring buffers 1026 for new I/O requests instead of using virtual IRQ notifications. In the illustrated example, an example buffer interface 1042 of the example BE block service driver 1012 accesses the I/O request in the shared ring buffers 1026, and an example queue interface 1044 of the BE block service driver 1012 works with an example native NVMe driver 1032 executed by the IOVM 1014 to create an I/O queue 1034 for the I/O request. In some examples, the queue interface 1044 may create multiple I/O queues 1034 concurrently to service multiple I/O requests from the guest VM 1002. The example I/O queues 1034 may be implemented using ring queues or circular queues. However, any other type of queue may be used instead. The example I/O queues 1034 may be created in system memory of the host machine 1002 and/or in any other suitable memory. In the illustrated example, an example translator 1046 of the BE block service driver 1012 translates virtual parameters (e.g., guest parameters) of the I/O request to physical parameters (e.g., host parameters). For example, the example translator 1046 may translate virtual memory addresses mapped to physical locations in the NVMe device 206 to physical memory addresses of those physical locations in the NVMe device 206. In the illustrated example, the I/O request includes DMA descriptors submitted in the I/O queue 1034 to identify the host physical address of the corresponding guest memory buffer 1022. In this manner, the I/O queue 1034 submits the I/O request and its DMA descriptors to the NVMe device 206 so that the NVMe device 206 can use the DMA descriptors to perform the DMA operation 1018 for the bulk data transfer of the requested data by directly accessing the host physical address of the corresponding guest memory buffer 1022. After the DMA operation 1018, an example notifier 1048 of the BE block service driver 1012 notifies the guest VM 1002 of the completion of the I/O request.

By performing the DMA operation 1018, the NVMe device 206 accesses the guest memory buffers 1022 directly, bypassing interception by the VMM 1006 of a bulk data transfer between the NVMe device 206 and the guest memory buffers 1022. This is shown in the illustrated example of FIG. 10 by dashed lines representative of VMM bypass communications 1038 between the I/O queues 1034 and the guest memory buffers 1022 and between the shared ring buffers 1026 and the guest memory buffers 1022. For example, from the perspective of the guest VM 1002 and the shared ring buffers 1026, the example ZCBV-PVIO technique of FIG. 10 results in a virtual DMA operation 1042 because the data can be accessed quickly using the guest memory buffers 1022 rather than needing to use a lengthy data transfer process via the VMM 1006.

While examples of implementing the ZCBV-MPT techniques are disclosed in connection with FIGS. 2-9, and example manners of implementing the ZCBV-PVIO techniques are disclosed in connection with FIG. 10, one or more of the elements, processes and/or devices illustrated in FIGS. 2-10 may be combined, divided, re-arranged, omitted, eliminated and/or implemented in any other way. Further, the example guest native drivers 214a, 214b (FIG. 2), the example virtual NVMe device 224 (FIG. 2), the example guest queue manager 216 (FIG. 2), the example mediator 218 (FIG. 2), the example shadow queue manager 220 (FIG. 2), the example host native NVMe driver 222 (FIG. 2), the example ATT 228 (FIG. 2), the example PVIO FE block driver 1008 (FIG. 10), the example BE block service driver 1012 (FIG. 10), the example buffer interface 1042 (FIG. 10), the example queue interface 1044 (FIG. 10), the example translator 1046 (FIG. 10), the example notifier 1048 (FIG. 10), and/or the example native NVMe driver 1032 (FIG. 10) may be implemented by hardware, software, firmware and/or any combination of hardware, software and/or firmware. Thus, for example, any of the example guest native drivers 214a, 214b (FIG. 2), the example virtual NVMe device 224 (FIG. 2), the example guest queue manager 216 (FIG. 2), the example mediator 218 (FIG. 2), the example shadow queue manager 220 (FIG. 2), the example host native NVMe driver 222 (FIG. 2), the example ATT 228 (FIG. 2), the example PVIO FE block driver 1008 (FIG. 10), the example BE block service driver 1012 (FIG. 10), the example buffer interface 1042 (FIG. 10), the example queue interface 1044 (FIG. 10), the example translator 1046 (FIG. 10), the example notifier 1048 (FIG. 10), and/or the example native NVMe driver 1032 (FIG. 10) could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example guest native drivers 214a, 214b (FIG. 2), the example virtual NVMe device 224 (FIG. 2), the example guest queue manager 216 (FIG. 2), the example mediator 218 (FIG. 2), the example shadow queue manager 220 (FIG. 2), the example host native NVMe driver 222 (FIG. 2), the example ATT 228 (FIG. 2), the example PVIO FE block driver 1008 (FIG. 10), the example BE block service driver 1012 (FIG. 10), the example buffer interface 1042 (FIG. 10), the example queue interface 1044 (FIG. 10), the example translator 1046 (FIG. 10), the example notifier 1048 (FIG. 10), and/or the example native NVMe driver 1032 (FIG. 10) is/are hereby expressly defined to include a non-transitory computer readable storage device or storage disk such as a memory, a digital versatile disk (DVD), a compact disk (CD), a Blu-ray disk, etc. including the software and/or firmware. Further still, the example ZCBV-MPT techniques and/or ZCBV-PVIO techniques may include one or more elements, processes and/or devices in addition to, or instead of, those illustrated in FIGS. 2-10, and/or may include more than one of any or all of the illustrated elements, processes and devices.

In examples disclosed herein, command access means for accessing commands submitted to the guest queues 226a, 226b of FIG. 2 may be implemented by the guest queue manager 216 of FIG. 2. In addition, example command access means for accessing commands submitted to the shared ring buffers 1026 of FIG. 10 may be implemented by the buffer interface 1042 of FIG. 10. In examples disclosed herein, translation means for generating translated commands may be implemented by the mediator 218 of FIG. 2 and/or the translator 1046 of FIG. 10. In examples disclosed herein, command submission means for submitting translated commands to the shadow queues 230a, 230b of FIG. 2 may be implemented by the mediator 218. In addition, example command submission means for submitting translated commands to the I/O queues 1034 of FIG. 10 may be implemented by the queue interface 1044 of FIG. 10. In examples disclosed herein, completion submission means for submitting completion status entries to the guest queues 226a, 226b of FIG. 2 may be implemented by the guest queue manager 216. In addition, example completion submission means for submitting completion status entries to the shared ring buffers 1026 of FIG. 10 may be implemented by the buffer interface 1042 of FIG. 10. In examples disclosed herein, queue creation means may be implemented by the guest queue manager 216 of FIG. 2 for creating the guest queues 226a, 226b, may be implemented by the shadow queue manager 220 and/or the mediator 218 of FIG. 2 for creating the shadow queues 230a, 230b, and/or may be implemented by the queue interface 1044 of FIG. 10 and/or the native NVMe driver 1032 of FIG. 10 to create the I/O queues 1034. In examples disclosed herein, command interception means for determining whether commands are to be handled by physical resources (e.g., the NVMe device 206 of FIG. 2) may be implemented by the guest queue manager 216. In the illustrated example, completion status notification means for notifying guest VMs of completions of commands submitted by the guest VMs may be implemented by the notifier 1048 of FIG. 10.

Figure 11:
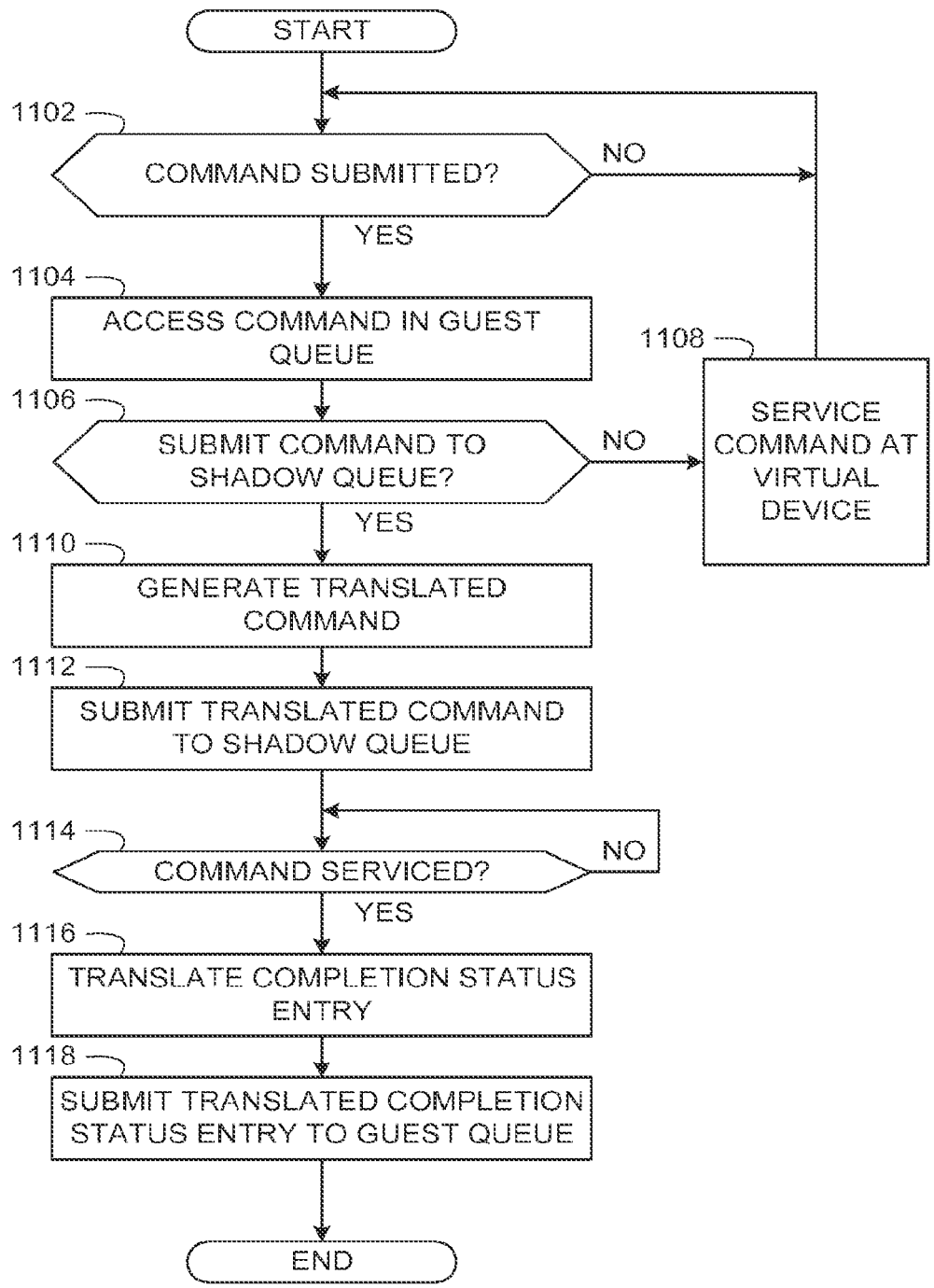
FIG. 11 is a flow diagram representative of example machine readable instructions that may be executed to implement the example ZCBV-MPT techniques described in connection with FIGS. 2-9.
Figure 12:
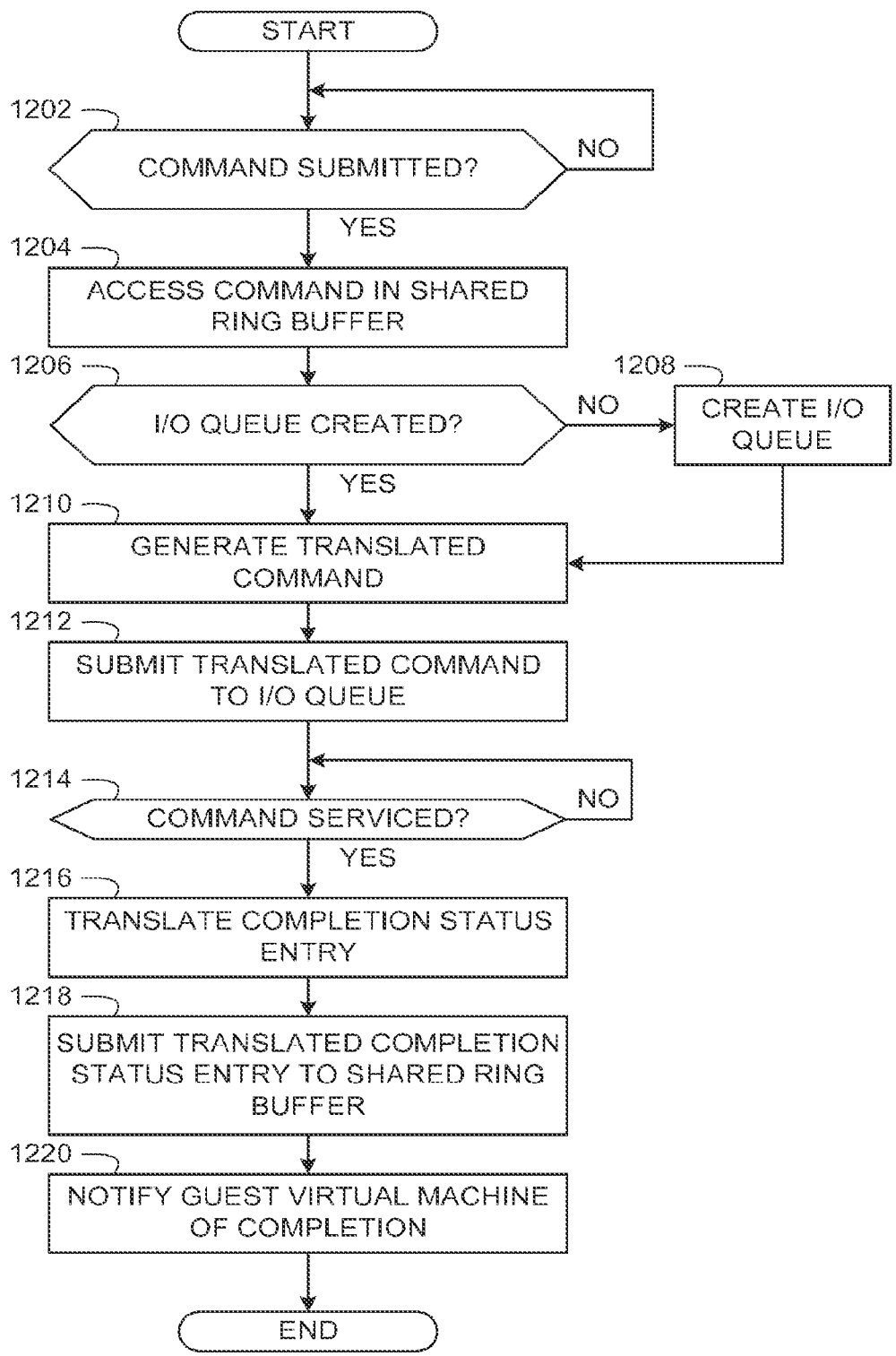
FIG. 12 is a flow diagram representative of example machine readable instructions that may be executed to implement the example ZCBV-PVIO techniques described in connection with FIG. 10.

A flowchart representative of example machine readable instructions for implementing the ZCBV-MPT technique of FIGS. 2-9 is shown in FIG. 11, and a flow chart representative of example machine readable instructions for implementing the ZCBV-PVIO technique of FIG. 10 is shown in FIG. 12. In these examples, the machine readable instructions implement programs for execution by one or more processors such as the processor(s) 1312 shown in the example processor platform 1300 discussed below in connection with FIG. 13. These programs may be embodied in software stored on a non-transitory computer readable storage medium such as a CD-ROM, a floppy disk, a hard drive, a digital versatile disk (DVD), a Blu-ray disk, or a memory associated with the processor 1312, but the entire programs and/or parts thereof could alternatively be executed by a device other than the processor(s) 1312 and/or embodied in firmware or dedicated hardware. Further, although the example programs are described with reference to the flowcharts illustrated in FIGS. 11 and 12, many other methods of implementing the example ZCBV-MPT techniques and/or the example ZCBV-PVIO techniques may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 11 and 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and/or to exclude transmission media. As used herein, "including" and "comprising" (and all forms and tenses thereof) are to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example of FIG. 11 is described in connection with the guest VM-A 202a of FIG. 2. However, the example of FIG. 11 may be implemented using the guest VM-B 202b, any other guest VM, and/or multiple guest VMs concurrently. The program of FIG. 11 begins at block 1100 at which the example guest queue manager 216 of the virtual NVMe device 224 (FIG. 2) determines whether a command has been submitted. For example, the guest queue manager 216 determines whether an I/O command or an administrative command has been submitted to the guest queues 226a (FIG. 2) based on, for example, a queue change notification from the guest queues 226a. In the illustrated example, if a command has not been submitted, control remains at block 1102 awaiting submission of a command.

If a command has been submitted to the guest queues 226a (block 1104), the example guest queue manager 216 accesses the command in the guest queue 226a (block 1104). For example, the guest queue manager 216 may access an I/O command in an IOSQ of the guest queue 226a, or may access an administrative command in an ASQ of the guest queue 226a. The example guest queue manager 216 determines whether to submit the command to a shadow queue 230a (FIG. 2) (block 1106). For example, the guest queue manager 216 may determine whether to submit the command to the shadow queue 230a based on whether the command is to be handled by the NVMe device 206. The guest queue manager 216 may make such a determination based on, for example, whether the command is an I/O command requesting to access data (e.g., read/write data) in the NVMe device 206 (e.g., data that is not available in the corresponding guest memory buffer 234a of FIG. 2), or the command is an administrative command to access a configuration of the NVMe device 206 (e.g., read/set configuration information of the NVMe device 206 that is not available for access in the virtual NVMe device 224). If the guest queue manager 216 determines that the command should not be submitted to the shadow queue 230a, control advances to block 1108 at which the virtual NVMe device 224 services the command. For example, the virtual NVMe device 224 may provide requested configuration information to the guest VM 202a and/or direct the guest VM 202a to a location in the guest memory buffer 234a that stores data requested by the guest VM 202a.

If the guest queue manager 216 determines at block 1106 that the command should not be submitted to the shadow queue 230a, the example mediator 218 (FIG. 2) generates a translated command (block 1110). For example, the mediator 218 generates the translated command by translating one or more virtual parameter(s) of the command associated with the guest VM 202a to one or more physical parameter(s) associated with the NVMe device 206. Example virtual parameters may include virtual memory addresses of data to be accessed, virtual queue identifiers of the guest queues 226a, 226b, etc. used by virtualized resources such as the guest VM 202a. Physical parameters may include physical memory addresses of the data to be accessed, physical queue identifiers of the shadow queues 230a, 230b and/or the physical queues 231, etc. used by physical resources such as the NVMe device 206. In the illustrated example, if the command is an I/O command, the address of a guest memory buffer 234a (FIGS. 2 and 4) for use in performing a DMA operation 233 (FIGS. 2 and 4) is the same in both the original command submitted to the guest queue 226a by the guest native NVMe driver 214a and the translated command. In this manner, the data corresponding to the I/O command is accessible in the same guest memory buffer 234a to the guest VM 202a and the NVMe device 206.

The example mediator 218 and/or the shadow queue manager 220 submits the translated command to the shadow queue 230a (block 1112). For example, the mediator 218 and/or the shadow queue manager 220 may submit a translated I/O command to an IOSQ of the shadow queue 230a or a translated administrative command to an ASQ of the shadow queue 230a. In some examples, the mediator 218 and/or the shadow queue manager 220 (FIG. 2) create the shadow queue 230a before submitting the translated command to the shadow queue 230a.

The example shadow queue manager 220 determines whether the translated command has been serviced (block 1114). For example, the shadow queue manager 220 may detect an interrupt that is asserted by the shadow queue 230a in response to the host native NVMe driver 222 (FIG. 2) submitting a completion status entry to an IOCQ or an ACQ of the shadow queue 230a. In the illustrated example, if the translated command has not been serviced, the shadow queue manager 220 waits for service completion of the translated command. When the translated command has been serviced, control advances to block 1116 at which the example mediator 218 translates the completion status entry (block 1116). For example, the mediator 218 accesses the completion status entry from an IOCQ or an ACQ of the shadow queue 230a, and it translates the completion status entry by converting one or more physical parameters to one or more corresponding virtual parameters for use by the guest VM 202a. In some examples, the completion status entry is indicative of completion of a DMA operation (e.g., the DMA operation 233 of FIGS. 2 and 4) that copies data from/to the NVMe device 206 to/from the guest memory buffer 234a corresponding to the guest VM 202a. The example guest queue manager 216 submits the translated completion status entry to the guest queue 226a (block 1118). For example, the guest queue manager 216 writes the translated completion status entry to an IOCQ or an ACQ of the guest queue 226a. The example process of FIG. 11 ends.

FIG. 12 is a flow diagram representative of example machine readable instructions that may be executed to implement the example ZCBV-PVIO techniques disclosed herein. Although the example program of FIG. 12 is described in connection with I/O commands, the example program of FIG. 12 may be similarly used to process administrative commands using the example ZCBV-PVIO techniques disclosed herein. In addition, although the example program of FIG. 12 is described in connection with a single guest VM (e.g., the guest VM 1002 of FIG. 10), the example program may be implemented to service commands for multiple guest VMs concurrently. The program of FIG. 12 begins at block 1202 at which the example BE block service driver 1012 (FIG. 10) determines whether a command has been submitted. For example, the BE block service driver 1012 determines whether a command has been submitted by the PVIO FE block driver 1008 of the guest VM 1002 via a shared ring buffer 1026 (FIG. 10) based on, for example, a buffer change notification from the shared ring buffer 1026 and/or a notification from the PVIO FE block driver 1008 of the submitted command. In the illustrated example, if a command has not been submitted, control remains at block 1202 awaiting submission of a command.

If a command has been submitted to the shared ring buffer 1026 (block 1202), the example buffer interface 1042 (FIG. 10) of the example BE block service driver 1012 accesses the command in the shared ring buffer 1026 (block 1204). The example queue interface 1044 (FIG. 10) of the example BE block service driver 1012 determines whether an I/O queue 1034 (FIG. 10) has been created (block 1206) to submit the command to the native NVMe driver 1032 (FIG. 10). If the example queue interface 1044 determines at block 1206 that the I/O queue 1034 has not been created, control advances to block 1208 at which the queue interface 1044 and/or the native NVMe driver 1032 creates the I/O queue 1034. For example, the example queue interface 1044 may send a request to the native NVMe driver 1032 to create the I/O queue 1034.

If the example queue interface 1044 determines at block 1206 that the I/O queue 1034 has been created, the example translator 1046 (FIG. 10) generates a translated command (block 1210). For example, the translator 1046 generates the translated command by translating one or more virtual parameter(s) of the command associated with the guest VM 1002 to one or more physical parameter(s) associated with the NVMe device 206. Example virtual parameters may include virtual memory addresses mapped to physical locations in the NVMe device 206 in which data is to be accessed, virtual queue identifiers, shared ring buffer identifiers, etc. used by virtualized resources such as the guest VM 1002. Physical parameters may include physical memory addresses of the physical locations in the NVMe device 206 in which the data is located, physical queue identifiers, etc. For example, the physical parameters are used by physical resources such as the NVMe device 206 to service the translated command. In the illustrated example, the address of a guest memory buffer 1022 (FIG. 10) for use in performing a DMA operation 1018 (FIG. 10) is the same in both the original command submitted by the guest VM 1002 and the translated command. In this manner, the data corresponding to the I/O command is accessible in the same guest memory buffer 1022 to the guest VM 1002 and the NVMe device 206.

The example queue interface 1044 submits the translated command to the I/O queue 1034 (block 1212). For example, the queue interface 1044 may submit a translated I/O command to an IOSQ of the I/O queue 1034.

The example BE block service driver 1012 determines whether the translated command has been serviced (block 1214). For example, the BE block service driver 1012 may detect an interrupt that is asserted by native NVMe driver 1032 in response to the NVMe device 206 signaling completion of the translated command and/or in response to a completion status entry being submitted to the I/O queue 1034 by the NVMe device 206 and/or by the native NVMe driver 1032. In the illustrated example, if the translated command has not been serviced, the BE block service driver 1012 waits for service completion of the translated command. When the translated command has been serviced, control advances to block 1216 at which the example translator 1046 translates the completion status entry (block 1216) from the I/O queue 1034. For example, the queue interface 1044 accesses the completion status entry from an IOCQ of the I/O queue 1034, and the translator 1046 translates the completion status entry by converting one or more physical parameters to one or more corresponding virtual parameters for use by the guest VM 1002. In some examples, the completion status entry is indicative of completion of a DMA operation (e.g., the DMA operation 1018 of FIG. 10) that copies data from/to the NVMe device 206 to/from the guest memory buffer 1022 corresponding to the guest VM 1002. The example buffer interface 1042 submits the translated completion status entry to the shared ring buffer 1026 (block 1218). The example notifier 1048 (FIG. 10) notifies the guest VM 1002 of the completion (block 1220). For example, the notifier 1048 sends a command completion notification to the PVIO FE block driver 1008 of the guest VM 1002 via the shared ring buffer 1026 and/or asserts a virtual interrupt to the PVIO FE block driver 1008. The example process of FIG. 12 ends.

Figure 13:
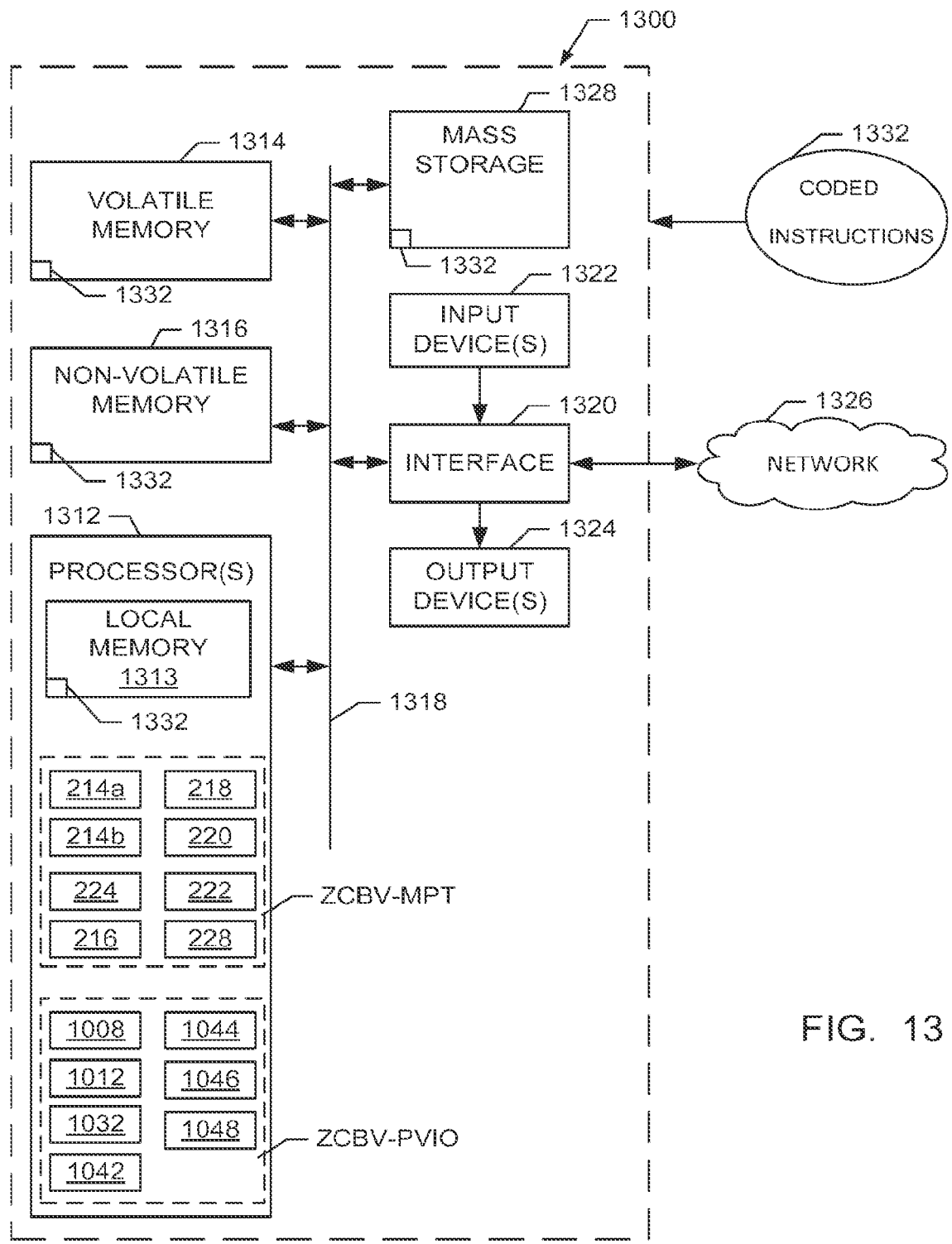
FIG. 13 is an example processor platform capable of executing the example machine readable instructions represented by FIG. 6, FIG. 7, FIG. 8, FIG. 9, and/or FIG. 11 to implement the example ZCBV-MPT techniques disclosed herein and/or capable of executing the example machine readable instructions represented by FIG. 12 to implement the example ZCBV-PVIO techniques disclosed herein.

FIG. 13 is a block diagram of an example processor platform 1300 capable of executing the instructions of FIGS. 6-9 and 11 to implement the example ZCBV-MPT techniques disclosed herein and/or capable of executing the instructions of FIG. 12 to implement the example ZCBV-PVIO techniques disclosed herein. The processor platform 1300 can be, for example, a server, a personal computer, a mobile device (e.g., a cell phone, a smart phone, a tablet such as an iPad® tablet), a personal digital assistant (PDA), an Internet appliance, a gaming console, a set top box, or any other type of computing device.

The processor platform 1300 of the illustrated example includes one or more processor(s) 1312. The processor(s) 1312 of the illustrated example is/are hardware. For example, the processor(s) 1312 can be implemented by one or more integrated circuits, logic circuits, microprocessors or controllers from any desired family or manufacturer. The hardware processor(s) may be a semiconductor based (e.g., silicon based) device. To implement the ZCBV-MPT techniques disclosed herein, the processor(s) 1012 of the illustrated example implement(s) one or more of the example guest native drivers 214a, 214b (FIG. 2), the example virtual NVMe device 224 (FIG. 2), the example guest queue manager 216 (FIG. 2), the example mediator 218 (FIG. 2), the example shadow queue manager 220 (FIG. 2), the example host native NVMe driver 222 (FIG. 2), and/or the example ATT 228 (FIG. 2). To implement the ZCBV-PVIO techniques disclosed herein, the processor(s) 1012 of the illustrated example implement(s) one or more of the example PVIO FE block driver 1008 (FIG. 10), the example BE block service driver 1012 (FIG. 10), the example buffer interface 1042 (FIG. 10), the example queue interface 1044 (FIG. 10), the example translator 1046 (FIG. 10), the example notifier 1048 (FIG. 10), and/or the example native NVMe driver 1032 (FIG. 10).

The processor(s) 1312 of the illustrated example include(s) a local memory 1313 (e.g., a cache). The processor(s) 1312 of the illustrated example is/are in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and/or commands into the processor(s) 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

Coded instructions 1332 implementing the example machine readable instructions of FIGS. 6-9, 11, and/or 12 may be stored in the mass storage device 1328, in the volatile memory 1314, in the non-volatile memory 1316, and/or on a removable tangible computer readable storage medium such as a CD or DVD.

From the foregoing, it will be appreciated that example methods, apparatus and articles of manufacture disclosed herein process commands from virtual machines using techniques that improve virtualization performance associated with accessing virtualized storage and/or memory space. Prior I/O virtualization technologies include direct pass-thru techniques, single root input/output virtualization (SR-IOV), and paravirtualization. Prior direct pass-thru techniques cannot be used to share a single physical device across multiple guest VMs, and therefore its usage is limited to virtualization configurations in which an entire hardware resource is exclusively allocated to only a single guest VM. SR-IOV can share a single physical device across several guest VMs. However, SR-IOV techniques require customized hardware extensions. As such, SR-IOV techniques are limited to hardware-based implementations. Such hardware-based implementations can be significantly costly based on, for example, how many virtual functions are to be supported in the SR-IOV hardware. Because of the hardware implementations, scalability is poor due to the need to design/manufacture new hardware when new virtual functions are to be added. Paravirtualized I/O techniques provide hardware neutral interfaces to guest VMs. However, paravirtualization requires CPUs of host machines to handle bulk data transfers between memory locations. As such, paravirtualization can overload CPU resources of host machines during memory-intensive processes.

Example ZCBV techniques disclosed herein improve virtualization performance associated with accessing data in physical resources from guest VMs. For example, ZCBV techniques disclosed herein eliminate the need to perform data copy operations on the VMM backend side of a virtualized system. In this manner, CPUs of host machines need not handle bulk data transfers. Instead, examples disclosed herein employ DMA data transfers to copy data between memory locations in response to data access requests from guest VMs. As a result, the example ZCBV techniques disclosed herein improve efficiencies of block device I/O virtualizations. In addition to reducing the usage of CPU cycles (e.g., used to perform copy operations of the bulk data between NVMe memory and guest VM memory space), example ZCBV techniques disclosed herein also improve responsiveness (e.g., reduce latency) of virtual resources (e.g., virtual data store resources based on underlying physical NVMe data store resources) and/or increase data transfer speeds. For example, data transfer speeds equal to or greater than 2000 megabytes per second (MB/s) can be achieved using examples disclosed herein with 3D crosspoint memory (e.g., implemented in Intel® Optane™ memories). In other implementations, such as when used with other types of NV memory devices, examples disclosed herein are useful to achieve other data transfer speeds.

The following pertain to further examples disclosed herein.

Example 1 is an apparatus to process a command from a virtual machine. The apparatus of Example 1 includes a guest queue manager to be in a virtual nonvolatile memory device of a virtual machine monitor executing on one or more processors, the guest queue manager to access a first command submitted to a guest queue by a native nonvolatile memory driver executing in a guest virtual machine; a mediator to generate a translated command based on the first command by translating a virtual parameter of the first command to a physical parameter associated with a physical nonvolatile memory device; a shadow queue manager to submit the translated command to a shadow queue to be processed by the physical nonvolatile memory device based on the physical parameter; and the guest queue manager to submit a completion status entry to the guest queue, the completion status entry indicative of completion of a direct memory access operation that copies data between the physical nonvolatile memory device and a guest memory buffer corresponding to the guest virtual machine.

In Example 2, the subject matter of Example 1 can optionally include that the translated command is to be processed by the physical nonvolatile memory device after the translated command is synchronized from the shadow queue in the virtual machine monitor to a physical queue in the physical nonvolatile memory device.

In Example 3, the subject matter of any one of Examples 1-2 can optionally include that the first command is at least one of an administrative command or an input/output command, the administrative command to at least one of manage a queue, obtain driver configuration information, or set driver configuration information, and the input/output command to access data in a memory.

In Example 4, the subject matter of any one of Examples 1-3 can optionally include that the virtual parameter includes a virtual memory address of the data, and the physical parameter includes a physical memory address of the data.

In Example 5, the subject matter of any one of Examples 1-4 can optionally include that the virtual parameter includes a guest queue identifier of the guest queue, and the physical parameter includes a host queue identifier of the shadow queue.

In Example 6, the subject matter of any one of Examples 1-5 can optionally include that the shadow queue manager is to create the shadow queue before submitting the translated command to the shadow queue.

In Example 7, the subject matter of any one of Examples 1-6 can optionally include that the guest queue manager is further to determine that the first command is to be handled by the physical nonvolatile memory device before translating the first command, the determination based on the first command being an I/O command requesting data from the physical nonvolatile memory device, or the first command being an administrative command to access a configuration of the physical nonvolatile memory device.

In Example 8, the subject matter of any one of Examples 1-7 can optionally include that the virtual nonvolatile memory device is a virtual nonvolatile memory express (NVMe) device, and the physical nonvolatile memory device is a physical NVMe device.

In Example 9, the subject matter of any one of Examples 1-8 can optionally include a memory; one or more processors in circuit with the memory; and a network interface in circuit with the one or more processors, the one or more processors to execute the guest queue manager, the mediator, and the shadow queue manager.

Example 10 is a non-transitory computer readable storage medium comprising instructions that, when executed, cause one or more processors to at least: access, by a virtual nonvolatile memory device in a virtual machine monitor, a first command submitted to a guest queue by a native nonvolatile memory driver executing in a guest virtual machine; generate, by the virtual nonvolatile memory device, a translated command based on the first command by translating a virtual parameter of the first command to a physical parameter associated with a physical nonvolatile memory device; submit, by the virtual nonvolatile memory device, the translated command to a shadow queue to be processed by the physical nonvolatile memory device based on the physical parameter; and submit, by the virtual nonvolatile memory device, a completion status entry to the guest queue, the completion status entry indicative of completion of a direct memory access operation that copies data between the physical nonvolatile memory device and a guest memory buffer corresponding to the guest virtual machine.

In Example 11, the subject matter of Example 10 can optionally include that the translated command is to be processed by the physical nonvolatile memory device after the translated command is synchronized from the shadow queue in the virtual machine monitor to a physical queue in the physical nonvolatile memory device.

In Example 12, the subject matter of any one of Examples 10-11 can optionally include that the first command is at least one of an administrative command or an input/output command, the administrative command to at least one of manage a queue, obtain driver configuration information, or set driver configuration information, and the input/output command to access data in a memory.

In Example 13, the subject matter of any one of Examples 10-12 can optionally include that the virtual parameter includes a virtual memory address of the data, and the physical parameter includes a physical memory address of the data.

In Example 14, the subject matter of any one of Examples 10-13 can optionally include that the virtual parameter includes a guest queue identifier of the guest queue, and the physical parameter includes a host queue identifier of the shadow queue.

In Example 15, the subject matter of any one of Examples 10-14 can optionally include that the instructions are further to cause the one or more processors to create, by the virtual nonvolatile memory device, the shadow queue before submitting the translated command to the shadow queue.

In Example 16, the subject matter of any one of Examples 10-15 can optionally include that the instructions are further to cause the one or more processors to determine that the first command is to be handled by the physical nonvolatile memory device before translating the first command, the determination based on the first command being an I/O command requesting data from the physical nonvolatile memory device, or the first command being an administrative command to access a configuration of the physical nonvolatile memory device.

In Example 17, the subject matter of any one of Examples 10-16 can optionally include that the virtual nonvolatile memory device is a virtual nonvolatile memory express (NVMe) device, and the physical nonvolatile memory device is a physical NVMe device.

Example 18 is a method to process a command from a virtual machine. The method of Example 18 includes accessing, by a virtual nonvolatile memory device in a virtual machine monitor executing on one or more processors, a first command submitted to a guest queue by a native nonvolatile memory driver executing in a guest virtual machine; generating, by the virtual nonvolatile memory device, a translated command based on the first command by translating a virtual parameter of the first command to a physical parameter associated with a physical nonvolatile memory device; submitting, by the virtual nonvolatile memory device, the translated command to a shadow queue to be processed by the physical nonvolatile memory device based on the physical parameter; and submitting, by the virtual nonvolatile memory device, a completion status entry to the guest queue, the completion status entry indicative of completion of a direct memory access operation that copies data between the physical nonvolatile memory device and a guest memory buffer corresponding to the guest virtual machine.

In Example 19, the subject matter of Example 18 can optionally include that the translated command is to be processed by the physical nonvolatile memory device after the translated command is synchronized from the shadow queue in the virtual machine monitor to a physical queue in the physical nonvolatile memory device.

In Example 20, the subject matter of any one of Examples 18-19 can optionally include that the first command is at least one of an administrative command or an input/output command, the administrative command to at least one of manage a queue, obtain driver configuration information, or set driver configuration information, and the input/output command to access data in a memory.

In Example 21, the subject matter of any one of Examples 18-20 can optionally include that the virtual parameter includes a virtual memory address of the data, and the physical parameter includes a physical memory address of the data.

In Example 22, the subject matter of any one of Examples 18-21 can optionally include that the virtual parameter includes a guest queue identifier of the guest queue, and the physical parameter includes a host queue identifier of the shadow queue.

In Example 23, the subject matter of any one of Examples 18-22 can optionally include creating, by the virtual nonvolatile memory device, the shadow queue before submitting the translated command to the shadow queue.

In Example 24, the subject matter of any one of Examples 18-23 can optionally include determining that the first command is to be handled by the physical nonvolatile memory device before translating the first command, the determination based on the first command being an I/O command requesting data from the physical nonvolatile memory device, or the first command being an administrative command to access a configuration of the physical nonvolatile memory device.

In Example 25, the subject matter of any one of Examples 18-24 can optionally include that the virtual nonvolatile memory device is a virtual nonvolatile memory express (NVMe) device, and the physical nonvolatile memory device is a physical NVMe device.

Example 26 is an apparatus to process a command from a virtual machine. The apparatus of Example 26 includes command access means to be in a virtual nonvolatile memory device of a virtual machine monitor executing on one or more processors, the command access means for accessing a first command submitted to a guest queue by a native nonvolatile memory driver executing in a guest virtual machine; translation means to generate a translated command based on the first command by translating a virtual parameter of the first command to a physical parameter associated with a physical nonvolatile memory device; command submission means for submitting the translated command to a shadow queue to be processed by the physical nonvolatile memory device based on the physical parameter; and completion submission means for submitting a completion status entry to the guest queue, the completion status entry indicative of completion of a direct memory access operation that copies data between the physical nonvolatile memory device and a guest memory buffer corresponding to the guest virtual machine.

In Example 27, the subject matter of claim 26 can optionally include that the translated command is to be processed by the physical nonvolatile memory device after the translated command is synchronized from the shadow queue in the virtual machine monitor to a physical queue in the physical nonvolatile memory device.

In Example 28, the subject matter of any one of claims 26-27 can optionally include that the first command is at least one of an administrative command or an input/output command, the administrative command to at least one of manage a queue, obtain driver configuration information, or set driver configuration information, and the input/output command to access data in a memory.

In Example 29, the subject matter of any one of claims 26-28 can optionally include that the virtual parameter includes a virtual memory address of the data, and the physical parameter includes a physical memory address of the data.

In Example 30, the subject matter of any one of claims 26-29 can optionally include that the virtual parameter includes a guest queue identifier of the guest queue, and the physical parameter includes a host queue identifier of the shadow queue.

In Example 31, the subject matter of any one of claims 26-30 can optionally include queue creation means for creating the shadow queue before submitting the translated command to the shadow queue.

In Example 32, the subject matter of any one of claims 26-31 can optionally include command interception means for determining that the first command is to be handled by the physical nonvolatile memory device before translating the first command, the determination based on the first command being an I/O command requesting data from the physical nonvolatile memory device, or the first command being an administrative command to access a configuration of the physical nonvolatile memory device.

In Example 33, the subject matter of any one of claims 26-32 can optionally include a memory; one or more processors in circuit with the memory; and a network interface in circuit with the one or more processors, the one or more processors to execute the command access means, the translation means, the command submission means, and the completion submission means.

Example 34 is an apparatus to process a command from a virtual machine. The apparatus of Example 34 includes a buffer interface to be in an input/output virtual machine executing on one or more processors, the buffer interface to access a first command submitted to a buffer by a paravirtualized input/output frontend block driver executing in a guest virtual machine; a translator to generate a translated command based on the first command by translating a virtual parameter of the first command to a physical parameter associated with a physical resource; a queue interface to submit the translated command to an input/output queue to be processed by a physical resource based on the physical parameter; and the buffer interface to submit a completion status entry to the buffer, the completion status entry indicative of completion of a direct memory access operation that copies data between the physical resource and a guest memory buffer corresponding to the guest virtual machine.

In Example 35, the subject matter of claim 34 can optionally include that the queue interface is further to create the input/output queue before submitting the translated command to the input/output queue.

In Example 36, the subject matter of any one of claims 34-35 can optionally include that the physical resource is a nonvolatile memory express device.

In Example 37, the subject matter of any one of claims 34-36 can optionally include that the virtual parameter includes at least one of a virtual memory address or a shared ring buffer identifier, and the physical parameter including at least one of a physical memory address or a physical queue identifier.

In Example 38, the subject matter of any one of claims 34-37 can optionally include that the physical resource is a nonvolatile memory express device.

In Example 39, the subject matter of any one of claims 34-38 can optionally include a notifier to notify the guest virtual machine of the completion of the first command.

In Example 40, the subject matter of any one of claims 34-39 can optionally include a memory; one or more processors in circuit with the memory; and a network interface in circuit with the one or more processors, the one or more processors to execute the buffer interface, the translator, and the queue interface.

Example 41 is a non-transitory computer readable storage medium comprising instructions that, when executed, cause one or more processors to at least: access a first command submitted to a buffer by a paravirtualized input/output frontend block driver executing in a guest virtual machine; generate a translated command based on the first command by translating a virtual parameter of the first command to a physical parameter associated with a physical resource; submit the translated command to an input/output queue to be processed by a physical resource based on the physical parameter; and submit a completion status entry to the buffer, the completion status entry indicative of completion of a direct memory access operation that copies data between the physical resource and a guest memory buffer corresponding to the guest virtual machine.

In Example 42, the subject matter of claim 41 can optionally include that the instructions are further to cause the one or more processors to create the input/output queue before submitting the translated command to the input/output queue.

In Example 43, the subject matter of any one of claims 41-42 can optionally include that the physical resource is a nonvolatile memory express device.

In Example 44, the subject matter of any one of claims 41-43 can optionally include that the virtual parameter includes at least one of a virtual memory address or a shared ring buffer identifier, and the physical parameter including at least one of a physical memory address or a physical queue identifier.

In Example 45, the subject matter of any one of claims 41-44 can optionally include that the physical resource is a nonvolatile memory express device.

In Example 46, the subject matter of any one of claims 41-45 can optionally include that the instructions are to further cause the one or more processors to notify the guest virtual machine of the completion of the first command.

Example 47 is a method to process a command from a virtual machine. The method of Example 47 includes accessing, by a backend block service driver in an input/output virtual machine executing on one or more processors, a first command submitted to a buffer by a paravirtualized input/output frontend block driver executing in a guest virtual machine; generating, by the backend block service driver, a translated command based on the first command by translating a virtual parameter of the first command to a physical parameter associated with a physical resource; submitting, by the backend block service driver, the translated command to an input/output queue to be processed by a physical resource based on the physical parameter; and submitting, by the backend block service driver, a completion status entry to the buffer, the completion status entry indicative of completion of a direct memory access operation that copies data between the physical resource and a guest memory buffer corresponding to the guest virtual machine.

In Example 48, the subject matter of claims 47 can optionally include creating, by at least one of the backend block service driver or a native device driver, the input/output queue before submitting the translated command to the input/output queue.

In Example 49, the subject matter of any one of claims 47-48 can optionally include that the physical resource is a nonvolatile memory express device.

In Example 50, the subject matter of any one of claims 47-9 can optionally include that the virtual parameter includes at least one of a virtual memory address or a shared ring buffer identifier, and the physical parameter including at least one of a physical memory address or a physical queue identifier.

In Example 51, the subject matter of any one of claims 47-50 can optionally include that the physical resource is a nonvolatile memory express device.

In Example 52, the subject matter of any one of claims 47-51 can optionally include notifying, by the backend block service driver, the guest virtual machine of the completion of the first command.

Example 53 is an apparatus to process a command from a virtual machine. The apparatus of Example 53 includes command access means to be in an input/output virtual machine executing on one or more processors, the command access mans for accessing a first command submitted to a buffer by a paravirtualized input/output frontend block driver executing in a guest virtual machine; translation means for generating a translated command based on the first command by translating a virtual parameter of the first command to a physical parameter associated with a physical resource; command submission means for submitting the translated command to an input/output queue to be processed by a physical resource based on the physical parameter; and completion submission means for submitting a completion status entry to the buffer, the completion status entry indicative of completion of a direct memory access operation that copies data between the physical resource and a guest memory buffer corresponding to the guest virtual machine.

In Example 54, the subject matter of claim 53 can optionally include queue creation means for creating the input/output queue before submitting the translated command to the input/output queue.

In Example 55, the subject matter of any one of claims 53-54 can optionally include that the physical resource is a nonvolatile memory express device.

In Example 56, the subject matter of any one of claims 53-55 can optionally include that the virtual parameter includes at least one of a virtual memory address or a shared ring buffer identifier, and the physical parameter including at least one of a physical memory address or a physical queue identifier.

In Example 57, the subject matter of any one of claims 53-56 can optionally include that the physical resource is a nonvolatile memory express device.

In Example 58, the subject matter of any one of claims 53-57 can optionally include completion status notification means for notifying the guest virtual machine of the completion of the first command.

In Example 59, the subject matter of any one of claims 53-58 can optionally include a memory; one or more processors in circuit with the memory; and a network interface in circuit with the one or more processors, the one or more processors to execute the command access means, the translation means, the command submission means, and the completion submission means.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable storage medium comprising instructions to cause one or more processors to at least:
   access a first command submitted to a buffer by a paravirtualized input/output frontend block driver of a guest virtual machine;
   generate a translated command based on the first command by translating a virtual parameter of the first command to a physical parameter associated with a physical resource;

submit the translated command to an input/output queue to be processed by the physical resource based on the physical parameter; and submit a completion status entry to the buffer, the completion status entry indicative of completion of a direct memory access operation, the direct memory access operation to copy data between the physical resource and a guest memory buffer corresponding to the guest virtual machine.

2. The non-transitory computer readable storage medium as defined in claim 1, wherein the instructions are to cause the one or more processors to create the input/output queue before submitting the translated command to the input/output queue.

3. The non-transitory computer readable storage medium as defined in claim 1, wherein the physical resource is a nonvolatile memory express device.

4. The non-transitory computer readable storage medium as defined in claim 1, wherein the virtual parameter includes at least one of a virtual memory address or a shared ring buffer identifier.

5. The non-transitory computer readable storage medium as defined in claim 1, wherein the physical parameter includes at least one of a physical memory address or a physical queue identifier.

6. The non-transitory computer readable storage medium as defined in claim 1, wherein the physical resource is nonvolatile memory, and the direct memory access operation is a zero-copy operation that copies the data between the nonvolatile memory and the guest memory buffer without using cycles of a central processing unit.

7. The non-transitory computer readable storage medium as defined in claim 1, wherein the instructions are to cause the one or more processors to notify the guest virtual machine of completion of the first command.

8. An apparatus comprising:
means for accessing a first command submitted to a buffer by a paravirtualized input/output frontend block driver of a guest virtual machine;
means for generating a translated command based on the first command by translating a virtual parameter of the first command to a physical parameter associated with a physical resource; and
means for submitting the translated command to an input/output queue to be processed by the physical resource based on the physical parameter,
the means for accessing to submit a completion status entry to the buffer, the completion status entry indicative of completion of a direct memory access operation, the direct memory access operation to copy data between the physical resource and a guest memory buffer corresponding to the guest virtual machine.

9. The apparatus as defined in claim 8, wherein the means for submitting is to cause creation of the input/output queue before submitting the translated command to the input/output queue.

10. The apparatus as defined in claim 8, wherein the physical resource is a nonvolatile memory express device.

11. The apparatus as defined in claim 8, wherein the virtual parameter includes at least one of a virtual memory address or a shared ring buffer identifier.

12. The apparatus as defined in claim 8, wherein the physical parameter includes at least one of a physical memory address or a physical queue identifier.

13. The apparatus as defined in claim 8, wherein the physical resource is nonvolatile memory, and the direct memory access operation is a zero-copy operation that copies the data between the nonvolatile memory and the guest memory buffer without using cycles of a central processing unit.

14. The apparatus as defined in claim 8, further including means for notifying the guest virtual machine of completion of the first command.

15. A method comprising:
accessing, by a backend block service driver in an input/output virtual machine executing on one or more processors, a first command submitted to a buffer by a paravirtualized input/output frontend block driver executing in a guest virtual machine;
generating, by the backend block service driver, a translated command based on the first command by translating a virtual parameter of the first command to a physical parameter associated with a physical resource;
submitting, by the backend block service driver, the translated command to an input/output queue to be processed by the physical resource based on the physical parameter; and
submitting, by the backend block service driver, a completion status entry to the buffer, the completion status entry indicative of completion of a direct memory access operation, the direct memory access operation to copy data between the physical resource and a guest memory buffer corresponding to the guest virtual machine.

16. The method as defined in claim 15, further including creating, by at least one of the backend block service driver or a native device driver, the input/output queue before submitting the translated command to the input/output queue.

17. The method as defined in claim 15, wherein the physical resource is a nonvolatile memory express device.

18. The method as defined in claim 15, wherein the virtual parameter includes at least one of a virtual memory address or a shared ring buffer identifier.

19. The method as defined in claim 15, wherein the physical parameter includes at least one of a physical memory address or a physical queue identifier.

20. The method as defined in claim 15, wherein the physical resource is nonvolatile memory, and the direct memory access operation is a zero-copy operation that copies the data between the nonvolatile memory and the guest memory buffer without using cycles of a central processing unit.

21. The method as defined in claim 15, further including notifying, by the backend block service driver, the guest virtual machine of completion of the first command.

* * * * *